(12) United States Patent
Hohenberg

(10) Patent No.: US 10,717,352 B2
(45) Date of Patent: Jul. 21, 2020

(54) MOTOR VEHICLE WITH A COMBINED DRIVE

(75) Inventor: Guenter Hohenberg, Graz (AT)

(73) Assignee: IVD PROF. HOHENBERG GMBH, Graz (AT)

( * ) Notice: Subject to any disclaimer, the term of this patent is extended or adjusted under 35 U.S.C. 154(b) by 517 days.

(21) Appl. No.: 13/582,189

(22) PCT Filed: Mar. 2, 2011

(86) PCT No.: PCT/EP2011/001040
§ 371 (c)(1),
(2), (4) Date: Oct. 30, 2012

(87) PCT Pub. No.: WO2011/107276
PCT Pub. Date: Sep. 9, 2011

(65) Prior Publication Data
US 2013/0046427 A1    Feb. 21, 2013

(30) Foreign Application Priority Data
Mar. 2, 2010   (DE) .................. 10 2010 009 832

(51) Int. Cl.
*B60K 6/00*      (2006.01)
*B60K 6/48*      (2007.10)
(Continued)

(52) U.S. Cl.
CPC .............. *B60K 6/48* (2013.01); *B60K 6/365* (2013.01); *B60W 20/19* (2016.01);
(Continued)

(58) Field of Classification Search
CPC ...... B60W 20/00; B60W 10/08; B60W 10/06; B60W 2510/244; B60W 10/26;
(Continued)

(56) References Cited

U.S. PATENT DOCUMENTS 5,842,534 A * 12/1998 Frank .................... 180/65.25
6,146,302 A * 11/2000 Kashiwase ................ 475/5
(Continued)

FOREIGN PATENT DOCUMENTS

CN     1181322 A     5/1998
CN     101244721 A   8/2008
(Continued)

*Primary Examiner* — Truc M Do
(74) *Attorney, Agent, or Firm* — Abel Schillinger, LLP

(57) ABSTRACT

A motor vehicle comprises a primary drive machine with a primary drive shaft for receiving or outputting power, a secondary drive machine with a secondary drive shaft for outputting power, and a secondary torque transmission device having an input side and an output side. A torque initiated by the input side and discharged by the output side can be influenced by the secondary torque transmission device. The vehicle further comprises an energy storage device and an output device which supplies the power output to the vehicle. The primary drive machine can be operated in a first operating state in which power is output by the primary drive shaft, and a second operating state in which power is received by the secondary drive shaft via the primary drive shaft and said power can be stored as energy in the energy storing device.

30 Claims, 11 Drawing Sheets

(51) Int. Cl.
  *B60K 6/365* (2007.10)
  *B60W 20/19* (2016.01)
(52) U.S. Cl.
  CPC .. *B60K 2006/4825* (2013.01); *B60W 2540/30* (2013.01); *Y02T 10/6221* (2013.01); *Y02T 10/6252* (2013.01); *Y02T 10/6269* (2013.01); *Y10T 74/19051* (2015.01)
(58) Field of Classification Search
  CPC ......... B60W 2510/0657; B60W 10/18; B60W 2510/0633
  See application file for complete search history.

(56) References Cited

U.S. PATENT DOCUMENTS

| | | | |
|---|---|---|---|
| 6,203,468 B1* | 3/2001 | Nitta et al. | 477/5 |
| 6,209,672 B1* | 4/2001 | Severinsky | 180/65.23 |
| 6,278,195 B1 | 8/2001 | Yamaguchi et al. | |
| 6,321,150 B1* | 11/2001 | Nitta | 701/32.7 |
| 6,344,008 B1* | 2/2002 | Nagano et al. | 475/1 |
| 8,292,782 B2* | 10/2012 | Yamanaka et al. | 477/45 |
| 8,758,200 B2* | 6/2014 | Dai et al. | 477/176 |
| 2001/0029220 A1* | 10/2001 | Kato | 477/5 |
| 2001/0039230 A1* | 11/2001 | Severinsky et al. | 477/3 |
| 2002/0082136 A1* | 6/2002 | Endo et al. | 477/83 |
| 2002/0173391 A1* | 11/2002 | Endo et al. | 474/18 |
| 2004/0055800 A1* | 3/2004 | Katou et al. | 180/65.2 |
| 2004/0063539 A1* | 4/2004 | Endo et al. | 477/45 |
| 2004/0124021 A1* | 7/2004 | Shirai et al. | 180/65.2 |
| 2005/0009665 A1* | 1/2005 | Cho | 477/5 |
| 2005/0049771 A1* | 3/2005 | Kuang et al. | 701/51 |
| 2005/0173169 A1 | 8/2005 | Gray, Jr. | |
| 2005/0179316 A1* | 8/2005 | Tobler et al. | 303/113.1 |
| 2005/0284674 A1* | 12/2005 | Menne et al. | 180/65.2 |
| 2006/0016631 A1* | 1/2006 | Kuang et al. | 180/65.2 |
| 2006/0025263 A1* | 2/2006 | Sowul | B60K 6/365 475/5 |
| 2006/0113129 A1* | 6/2006 | Tabata | B60K 6/365 180/65.25 |
| 2006/0174624 A1* | 8/2006 | Grabowski et al. | 60/709 |
| 2006/0225984 A1* | 10/2006 | Tanishima et al. | 192/48.8 |
| 2006/0247086 A1* | 11/2006 | Watanabe et al. | 475/208 |
| 2007/0007059 A1* | 1/2007 | Nomura | B60K 6/405 180/65.29 |
| 2007/0093335 A1* | 4/2007 | Usoro | B60K 6/448 475/5 |
| 2007/0193808 A1* | 8/2007 | Perakes et al. | 180/242 |
| 2007/0218786 A1* | 9/2007 | Tamba | B63H 20/20 440/86 |
| 2009/0023547 A1 | 1/2009 | Matsubara et al. | |
| 2009/0055061 A1* | 2/2009 | Zhu | B60K 6/48 701/55 |
| 2009/0114463 A1* | 5/2009 | DeVault | 180/65.29 |
| 2009/0176611 A1* | 7/2009 | Avery | 475/5 |
| 2009/0200094 A1* | 8/2009 | Zohrer et al. | 180/65.22 |
| 2009/0200095 A1* | 8/2009 | Kawasaki | 180/65.265 |
| 2009/0242286 A1* | 10/2009 | Tatematsu et al. | 180/65.21 |
| 2009/0250278 A1* | 10/2009 | Kawasaki et al. | 180/65.275 |
| 2009/0306843 A1* | 12/2009 | Jinno et al. | 701/22 |
| 2010/0030416 A1* | 2/2010 | Jinno | 701/22 |
| 2010/0106401 A1* | 4/2010 | Naito et al. | 701/201 |
| 2010/0273594 A1* | 10/2010 | Sung | B60K 6/40 475/5 |
| 2011/0021312 A1* | 1/2011 | Fukitani | 477/5 |
| 2011/0166733 A1* | 7/2011 | Yu et al. | 701/22 |
| 2011/0264317 A1* | 10/2011 | Druenert et al. | 701/22 |
| 2012/0035795 A1* | 2/2012 | Yu et al. | 701/22 |
| 2012/0108374 A1* | 5/2012 | Doihara et al. | 474/28 |
| 2012/0112710 A1* | 5/2012 | Haldeman | 322/40 |
| 2012/0115678 A1* | 5/2012 | Doihara et al. | 477/46 |
| 2012/0197472 A1* | 8/2012 | He et al. | 701/22 |
| 2012/0234135 A1* | 9/2012 | Oki | 74/665 A |
| 2012/0329593 A1* | 12/2012 | Larrabee et al. | 475/5 |
| 2013/0160731 A1* | 6/2013 | Poeltenstein et al. | 123/179.1 |
| 2013/0296127 A1* | 11/2013 | Shelton et al. | 477/5 |
| 2013/0310216 A1* | 11/2013 | Kamiya et al. | 477/5 |
| 2014/0372007 A1* | 12/2014 | Bauer | 701/99 |

FOREIGN PATENT DOCUMENTS

| | | |
|---|---|---|
| CN | 101468610 A | 7/2009 |
| CN | 101628541 A | 1/2010 |
| DE | 4344053 A1 | 7/1994 |
| DE | 102007004463 A1 | 8/2008 |

* cited by examiner

······ electric power flow
—— mechanical power flow

···· electric power flow
— mechanical power flow

MOTOR VEHICLE WITH A COMBINED DRIVE

BACKGROUND OF THE INVENTION

1. Field of the Invention

The present invention relates to a motor vehicle with a combined drive.

2. Discussion of Background Information

The development of road-going vehicles with purely electric drive or mixed drive with electric motor and combustion engine is currently attracting great attention worldwide. This is because of efforts to reduce the pollutant emissions from present road traffic, and in particular the emission of $CO_2$. The main aim is to be able to drive totally emission-free within cities using electric drive.

Furthermore today, to drive motor vehicles with combustion engines, practically exclusively liquid fossil fuels are used, the availability of which is limited. It is therefore to be expected that the prices for such fuels will rise strongly in the future, which will further increase the need for alternative drives.

The range of vehicles freely available on the market with purely electric drive is currently very small. One example freely available in the USA is the Tesla Roadster which is powered by an electric motor with 186 KW and has a total battery capacity of 53 kWh.

Various vehicle manufacturers are carrying out fleet tests with purely electric vehicles, e.g. BMW with the model "Mini E" which, according to press publications, has a drive power of 150 KW and a battery capacity of 35 kWh.

The current problem of all purely electric vehicles is the limited range. Even when high power batteries are used, it is difficult to achieve a range of more than 100 km.

The American car manufacturer General Motors announced (see e.g. the German version of Wikipedia) at the end of 2010 its intention to launch on the market an electric vehicle called the Chevrolet Volt, which is designed as an electric vehicle but also has a small combustion engine which drives a generator with which the batteries can be recharged. According to the published data, in electric mode the vehicle will have a range of up to 64 km. The combustion engine here therefore serves also to extend the range and is therefore called a "range extender". The concept is also known as "serial hybrid drive".

Another type of vehicle with combined drive is the so-called full hybrid vehicle. These are already available on the market in large numbers.

It is usual for new and complex technologies first to be used in expensive vehicles. Therefore the model Lexus RX 400h by Toyota is described below as an example of such a hybrid vehicle. This vehicle has a transverse-mounted, V6 petrol engine with a capacity of 3311 $cm^3$ which develops a power of 155 KW at 5600 rpm and a torque of 288 Nm at 4400 rpm.

To drive the front axle furthermore an electric motor is fitted at the front which emits a power of 123 KW at 4500 rpm. An electric motor provided at the rear to drive the rear axle emits a power of 50 KW at a speed of 4610 to 5120 rpm. Furthermore the drive train has an electric generator with a power of 109 KW and a traction battery with a capacity of 1.9 kWh. To combine and distribute the powers in the drive train, a planetary gear mechanism is used with electrically continuously variable rotation speed ratio, a so-called E-CVT planetary gear, and a planetary gear mechanism for rotation speed adjustment of the front electric motor, a so-called adapter planetary gear.

The drive train is structured as follows:

The output shaft of the V6 petrol engine is connected via a torsional vibration damper with the web of the E-CVT planetary gear. The output shaft of the electric generator is connected with the sun wheel toothing of the E-CVT planetary gear. The output shaft of the front electric motor is connected with the sun wheel toothing of the adapter planetary gear which shares a common ring gear with the E-CVT planetary gear that connects the two planetary gears together.

The planets mounted on the web of the E-CVT planetary gear and on the web of the adapter planetary gear intermesh with the respective sun wheel toothing and the common ring gear. The web of the adapter planetary gear is mounted rotationally fixed and cannot therefore execute any rotary movement about its center axis.

The common ring gear, on the outside in the radial direction, has external toothing which intermeshes with a gear wheel of an intermediate gear stage which is connected with a front axle differential via an output shaft. Via this front axle differential, the drive power of the V6 petrol engine and the front electric motor is distributed to the front wheels. The drive power of the rear electric motor is passed to the rear axle. There is no torque-transmitting connection between the rear axle and the front axle.

The E-CVT planetary gear is the central element for controlling the drive train in the RX 400h. It is controlled during driving with a view to a favorable efficiency.

The rotation speed ratio between the web and the ring gear of the E-CVT planetary gear can be varied by the rotation speed of the sun wheel toothing. The ring gear rotation speed of the E-CVT planetary gear is proportional to the travel speed. The V6 petrol engine is operated with maximum efficiency in one rotation speed range in order to optimize fuel consumption. From this requirement there arises a specific rotation speed ratio between web and ring gear. This rotation speed ratio is set by the rotation speed of the electric generator which is coupled to the sun wheel toothing.

Consequently in the case of the RX 400h, to operate the V6 petrol engine at an operating point with high efficiency, part of the drive power generated by the V6 petrol engine is converted into electrical power in the electric generator. If the electrical power thus generated is to be used to drive the vehicle, it must be converted back to mechanical power.

SUMMARY OF THE INVENTION

The object of the invention is to provide a motor vehicle with improved drive. This drive shall in particular offer lower fuel consumption, lower emissions and extended range using the technical means available today or in the near future.

This object is achieved according to the patent by the subject of claim 1. Preferred refinements are the subject of the subclaims.

The prior art has been described in detail with reference to a vehicle with an unladen weight of over 2000 kg and a total power of over 200 KW. Vehicles of this weight and power class constitute only a small proportion of the total vehicle fleet of a country.

The invention is therefore described below in particular with reference to a vehicle construction, the proportion of which in a vehicle fleet of a country is usually substantially higher, namely a motor vehicle with an unladen weight of around 800 kg to 1200 kg. In the present case the unladen weight is the weight without batteries. Such vehicles usually have four to five seats for adults and acceptable luggage space. They are therefore particularly suitable also as town vehicles. These vehicles are generally and also in the present case allocated to the so-called compact class.

It is however pointed out that this reference does not restrict the application of the invention. The invention can also be used in vehicles which have a lower or higher weight.

A motor vehicle in the sense of the invention is a vehicle which is intended in particular for the transport of persons and/or loads.

These include both single-track and in particular dual-track vehicles, and vehicles with two or more axles. In particular they include cars from one- or two-seater small vehicles up to heavier vehicles of the top class, small or large buses, light and heavy goods vehicles. The invention can be used very advantageously especially in light goods vehicles which are frequently used to transport loads in towns.

A combined drive system is a device for driving this motor vehicle.

A primary drive machine is a device which in particular provides drive power for the combined drive system. Preferably the primary drive machine is formed as an electric machine.

A secondary drive machine is a device which in particular provides drive power for a combined drive system. The secondary drive machine is preferably a combustion engine.

A torque transmission means is a means to transmit a torque which usually comprises an input and an output side. A torque transmission means preferably has two or three operating states. In a first operating state torque is transmitted from the input side to the output side. In a second operating state substantially no torque is transmitted. Where applicable in a third operating state a torque is transmitted from the output side to the input side.

Preferably these at least two operating states can be influenced by internal or external control commands. External control commands are transmitted to the torque transmission means from the outside, internal control commands are generated within the torque transmission means. Preferably the internal control commands are generated by analysis of the rotation speeds of the input and/or output side. Internal control commands can be overlaid by external control commands and vice versa.

An energy storage device is a device which is intended to receive power over a specific period and output this power again at a later time. This energy storage device preferably has three operating states. In a first operating state energy is transmitted to the energy storage device. In a second operating state preferably an energy content contained in the energy storage device is substantially maintained. In a third operating state power is transmitted by the energy storage device directly or indirectly in particular to the primary drive machine.

The energy storage device is preferably a secondary battery i.e. a nickel-metal hydride or lithium-ion battery. However, other energy accumulators can be used e.g. capacitors or e.g. kinetic energy accumulators working on the flywheel principle or similar.

For the supply of energy to the energy storage device, preferably there are three modes. In the first mode energy is supplied from an external source (plug-in), preferably conductively and/or inductively. In the second mode preferably the energy storage device is charged by the primary drive machine, driven by the secondary drive machine (active charging). In the third mode the charging is performed by recuperation on braking and similar (passive charging).

An output device is a device which conducts the drive power in a motor vehicle into at least one drive element of the vehicle. An output device can preferably comprise one or more torque transmission means, a gear mechanism and/or a differential gear mechanism.

A gear mechanism is a device which has at least a gear input element, a gear output element and a gear casing, and serves to transmit a rotation speed and/or a torque.

A drive element of a motor vehicle is an element which transmits the drive power of a motor vehicle to the ground. Preferably a drive element of a vehicle is formed as a wheel/tire combination.

A first operating state of the primary drive machine is a state in which this outputs power to its primary drive shaft.

A second operating state of the primary drive machine is a state in which this receives power at its primary drive shaft. To receive power the primary drive shaft is preferably set in rotary motion by an external force. This external force is preferably applied by the secondary drive machine or by the output device onto the primary drive shaft.

Another object of the invention is to improve, in addition to fuel consumption and emissions, the so-called NVH behavior of the vehicle. NVH stands for noise, vibration and harshness, and characterizes the vehicle behavior amongst others in relation to vibrations from the drive train, and the noise behavior of the drive.

Description of Fundamental Concept

The present invention is based on a fundamental concept which can be modified within the scope of the disclosure of this application.

The fundamental concept is based firstly on the assumption that the battery capacity will also become relatively costly in the near future. Companies e.g. Robert Bosch GmbH currently (start of 2010) quote a battery price for lithium-ion batteries of 1500.00 Euro/kWh. It is assumed that as production capacity increases, this price will fall to 500.00 Euro/kWh, optimistic assumptions go as far as 250.00 Euro/kWh. For a 50 kWh battery therefore, even with the present optimistic assumption, a minimum price of 25,000.00 to 50,000.00 Euro must be expected.

The energy content of a liter of diesel is 10 kWh, the cost for storage is approximately € 50 for 50 liters, equivalent to 500 kWh.

As well as costs, weight is a problem with lithium-ion batteries. The Audi prototype E-tron unveiled at the start of 2010 in Detroit uses a lithium-ion battery weighing 400 kg, which has a capacity of 45 kWh.

Usually it is assumed today that in a vehicle of the compact class described here for preference, a battery capacity of around 20 kWh allows a range of around 100 km. This is also confirmed by the model BMW Mini E already mentioned, which for a battery capacity of 35 kWh has a range of around 150 km, which however is significantly reduced if the battery is also used for heating or cooling and on frequent acceleration processes. On the other hand it is known that—depending on country and region—the predominant proportion of vehicles on average cover less than 100 km per day. To drive a vehicle with a range of e.g. 400 km electrically would therefore require a very expensive and very heavy battery, which would also have a significantly disadvantageous effect on the driving behavior of the motor vehicle without bringing any particular advantages for the average daily use.

On the other hand, it is problematical for a vehicle user to see the availability of his vehicle and components e.g. the heater restricted by the battery capacity. The latter applies in particular but not only when the user has only a single vehicle. Weekend excursions cannot then be carried out with the vehicle due to lack of range.

The fundamental concept explained here therefore provides, in addition to the electric drive, a combustion engine which extends the range as a so-called "range extender".

The fundamental concept furthermore provides that this combustion engine can be used together with the electric motor to increase the drive power. This has substantial benefits for the selection of both the electric motor and the combustion engine. As the electric motor and combustion engine can work together during acceleration processes, the power of both the electric motor and the combustion engine can be kept lower than would be possible for a purely electric or purely combustion engine drive.

Thus substantial weight can be saved both in the electric motor and in the combustion engine. Weight is however a great problem in electrically operated vehicles, since for the same power the weight of an electric motor is around twice as high as that of a combustion engine, and the high weight of the battery must also be taken into account. As the weight of a vehicle is however a decisive parameter for its fuel consumption, the resulting weight reduction leads to a significantly lower fuel consumption.

The use of a smaller combustion engine furthermore allows the combustion engine to work frequently in the region of its top performance limit. Since combustion engines have comparatively poor fuel consumption values in the part load range, this measure further reduces the energy requirement for propulsion. A smaller electric motor and smaller combustion engine finally reduce the space required for the drive system, which—especially in vehicles of the compact class—is of considerable importance for their usability.

The invention in particular proposes a mechanical coupling of primary drive machine and secondary drive machine, known as the "mechanical through-drive".

The fundamental concept described here, in which an electric motor serves as a primary drive machine but a combustion engine as a secondary drive machine is mechanically connected with the primary drive machine and the output device to generate a mechanical through-drive, is designated in the context of this application as "integrated range extender" (IRE). The term "integrated" is derived from the fact that the combustion engine is directly integrated in the vehicle drive system as a secondary drive machine.

With the serial hybrid described in relation to the prior art, the combustion engine merely charges the battery without itself being involved in generating the drive moment. This firstly has the advantage that the combustion engine can always be operated in the region of its maximum efficiency during charging. This is however offset against the fact that the region of maximum efficiency in a combustion engine is located for efficiency reasons in the range of relatively high rotation speeds. With such a serial hybrid the combustion engine thus runs at high rotation speeds even when the vehicle is at rest, e.g. waiting at traffic lights. This could be considered unacceptable by users, inter alia under the aspect of NVH comfort mentioned above.

It appears disadvantageous in particular that in the region of range extension, the kinetic or mechanical energy of the combustion engine is first converted into electrical energy and then converted back in the electric motor into kinetic or mechanical energy. This double energy conversion entails a significant loss of efficiency and reduces the efficiency of such a system.

In contrast, with the fundamental concept of the vehicle with integrated range extender (IRE) presented here, the kinetic energy generated in the combustion engine is used directly to drive the vehicle via the mechanical through-drive. This obviates the need for two energy conversion processes, whereby the efficiency is increased substantially.

This is indeed offset by the fact that the combustion engine at its starting rotation speed is coupled directly or via a gear mechanism with an output device of the vehicle and hence finally also with the drive elements of the vehicle, generally the wheels. Therefore the combustion engine in the IRE must work over a wider rotation speed range than is the case in a serial hybrid. This disadvantage is however compensated firstly by the higher efficiency as a result of the mechanical through-drive. Secondly engines known today, in particular with corresponding variability of fuel injection, ignition timing, valve timing and where applicable also capacity, can be controlled such that they work with high efficiency over a wider rotation speed range.

If with the IRE an operating mode is desired in which—as in a serial hybrid—charging of the battery must also be possible when stopped, this can be achieved in a simple manner in that a switchable clutch is fitted between the electric motor serving as a primary drive machine and the output device or at another point of the drive train.

The disadvantage of a possibly lower efficiency over the wide rotation speed range is also compensated in that in the IRE the electric motor serving as a primary drive machine is also used as a generator to charge the battery. No separate generator, as is needed in a serial hybrid, is therefore required.

The fundamental concept furthermore preferably provides that a gear mechanism is used with few translation stages, preferably two translation stages and preferably also the rotation speed of the electric motor is varied by a gear mechanism.

By this measure in comparison with conventional hybrid vehicles—such as the abovementioned model Lexus RX 450h—highly complex gear mechanisms are largely avoided. This leads to a reduction in weight, construction costs and the space required. Furthermore with this measure an electric motor can be used which has a lower torque at higher rotation speeds so that here too a further reduction in weight and space is achieved.

The fundamental concept furthermore provides that only a single combined electric motor/generator is used. With this measure too, weight and construction space can be saved. In particular when a correspondingly designed gear mechanism is used, it is thus possible to design the electric machine serving as motor and generator such that it always works in the region of the most favorable efficiency.

The design of the electric motor can—but need not—be simplified further if in a preferred embodiment of the invention the combustion engine is fitted with a separate starter, and particularly preferably also with a separate alternator. Here starter and alternator can also be combined. This has the advantage that the electric machine which constitutes the primary drive machine in the context of the basic invention can be optimized with regard to efficiency without having to take into account its use as a starter. This advantageously compensates for the greater space and weight for the additional starter and/or alternator. It must be taken into account that in the context of the fundamental concept, a smaller combustion engine is used so that only a small starter is needed, and if also a separate alternator is used, this too can be made small if it does not have to fulfill further tasks e.g. power supply to drive ancillary devices.

Vibrations in the drive train play a significant role in the drive of a motor vehicle with a combustion engine. These vibrations arise partly from the torque peaks which occur from the temporally successive combustion processes in the individual cylinders. Furthermore on use of a reciprocating piston engine, vibrations are also generated by the mass forces resulting in particular from the speed change of the piston at the top and bottom dead center. These mass forces can be controlled reasonably well in 4-cylinder engines and very well in 6-cylinder in-line engines and V8 engines. If however to increase efficiency a smaller combustion engine is used, the capacity of which preferably lies in the range of 1 liter or less, if designed as a 4-cylinder engine the cylinder volume of an individual cylinder would be 250 cm$^3$ or less. This would reduce the efficiency of combustion. In this case it is therefore preferred to use an engine with a lower number of cylinders e.g. a 3-cylinder or 2-cylinder engine. If such a 3- or 2-cylinder engine or even a 1-cylinder engine were used, the mass forces could not be balanced as easily as in an engine with 4 or more cylinders. Furthermore the ignition intervals would also be reduced if the rotation speed of the engine were not to be increased significantly in relation to rotation speeds conventional today.

The fundamental concept therefore proposes a preferred embodiment example of the mechanical through-drive, to arrange the combustion engine and electric motor on the same shaft and to omit an adapter gear mechanism which reduces the rotation speed of the electric motor. In this embodiment the electric motor is preferably also used to damp vibrations in the drive train resulting from the combustion engine. For this preferably a control device is used which calculates in advance the torque pulses of the combustion engine occurring due to combustion and mass forces, and generates in the electric motor corresponding compensation torques or compensation rotation movements or counter-vibrations. Compensation torques can be generated easily electrically in that the winding of the electric motor is subjected to a corresponding pulse. Alternatively or additionally compensation rotation movements can be generated on the housing of the electric motor in that this is mounted with torsional vibration capacity. The counter-rotation movements are then preferably generated electrically, in particular by an induction emitter or particularly preferably by piezo-electric emitters. With both designs, a length change can be produced by an electric pulse, which leads to a corresponding rotation movement of the housing of the electric motor which is arranged rotationally mobile.

In both variants it is of particular advantage if the signal from the engine control unit can be used directly to generate the counter-vibration. The engine control unit establishes firstly the timing of the next injection process and secondly also the injection quantity. These data can be used to determine analytically and/or empirically the size of the torque pulse excitation associated with combustion and calculate the corresponding counter-vibration.

The data from the engine control unit give a reliable picture of the torsional vibrations arising from the actual combustion process. Torsional vibrations also occur however from other phenomena in the drive train, in particular from resonance or resonance-like phenomena. These can be taken into account in calculation of the vibration excitation from the engine control data, in that they are determined e.g. empirically in advance. It is however also possible to arrange vibration sensors at one or more points on the drive train and use their signals to calculate the corresponding compensation measures. The data from this or these vibration sensor(s) can be used together with the data from the engine control unit to calculate the vibration compensation, but it is also possible within the scope of the invention to use the data from these vibration dampers alone without taking into account the data from the engine control unit.

As well as separately arranged vibration sensors, it is also possible to derive the vibrations directly from changes in the electrical field of the primary drive machine.

FURTHER PREFERRED EMBODIMENTS

In a preferred embodiment preferably the nominal power of the primary drive machine, usually the electric motor, and the nominal power of the secondary drive machine, usually the combustion engine, stand in a specific relationship to each other. Here a drive machine can briefly also output a power which is higher than the nominal power. Preferably the drive power ratio of the primary drive machine to the secondary drive machine lies in the range from 0.5 to 10, preferably in a range from 0.8 to 10, and particularly preferably in a range of 1 to 3. Particularly preferably the nominal power of the primary drive machine is greater than the nominal power of the secondary drive machine.

The drive in this drive power ratio is preferably controlled such that to drive the vehicle, substantially the primary drive machine is used. As a result the secondary drive machine is frequently operated in the range of its nominal power or particularly preferably in the range of a high efficiency.

In a further preferred embodiment the combined drive system substantially has only a single primary drive machine which preferably also alone provides the energy actively generated for storage in the energy storage device. Preferably the power of the primary drive machine which originates from potential or kinetic energy of the vehicle (passive charging) is stored in the energy storage device.

Because preferably only a single and not several primary drive machines are connected with the energy storage device, preferably an efficiently combined, less complex drive system results which is easier to control.

In a preferred embodiment the combined drive system preferably has at least one primary drive machine, a torque transmission means and a gear mechanism.

A gear mechanism preferably comprises one and/or two gear input elements and preferably one and/or two gear output elements. Preferably one or two gear input elements are connected with a power source. Preferably one gear output element is connected with a power sink. Preferably the rotation speed of at least one gear input element differs from the rotation speed of at least one gear output element. Preferably the primary drive shaft and the output side of the torque transmission means are each connected with a gear input element. In particular gear mechanisms are available in many different forms so that a combined drive system with a gear mechanism can be constructed economically and/or compactly.

In a preferred embodiment the rotation speed ratio between the rotation speed of at least one gear input element and the rotation speed of at least one gear output element is variable. Preferably this rotation speed ratio can be varied continuously within at least one specific range. Preferably several, preferably one to four and particularly preferably two to three separate rotation speed ratios of a gear mechanism can be selected. Preferably such a selectable gear mechanism is formed as a change gear with at least two different gear wheel pairs, as a planetary gear mechanism or as a double clutch gear mechanism.

By adjusting the rotation speed ratio of the gear mechanism, the rotation speeds of the drive machines can be adapted in a range with high efficiency and hence preferably low emissions and consumption-efficient operation (thereof).

In a preferred embodiment the torque-transmitting connection between the primary drive shaft and the gear mechanism can be interrupted, so that no torque is transmitted between these. Preferably a torque transmission means is arranged between the primary drive machine and the gear mechanism, which means is preferably designed as a clutch and particularly preferably as a switchable clutch or as an automatically switching clutch.

Switchable clutches can be brought by a control command from a first operating state in which a torque is transmitted into a second operating state in which no torque is transmitted, or conversely. For the switchable clutch, preferably an external control command can be predefined and the operating state changed with this. In the automatically switching clutch, preferably an internal control command can be generated. Preferably for this the rotation speed of the input side and/or the rotation speed of the output side of the torque transmission means is evaluated. If these rotation speeds stand in a preferred ratio and/or if one of these rotation speeds rises above or falls below a predefined speed, preferably an internal control command is generated and the automatically switching clutch can change its operating state. Preferably an automatically switching clutch is designed as a free-wheel mechanism or a centrifugal clutch. Instead of control via the rotation speed, preferably also control can be carried out via the torque and/or via rotation speed and torque together.

In a preferred embodiment the primary drive machine is an electromechanical energy converter in which electric energy is converted into mechanical or kinetic energy and/or mechanical or kinetic energy is converted into electrical energy.

In a preferred embodiment the primary drive machine is an electromechanical energy converter which is operated by a magnetic field permanently rotating about a rotation axis. This magnetic field is preferably provoked by at least one or more currents phase-offset to each other and/or by several electromagnetic coils offset to each other, and preferably forms a magnetic rotating field. Preferably the rotation axis of this rotation field and the primary drive shaft substantially coincide.

In a preferred embodiment the rotation speed of the primary drive shaft is equal to the rotation speed of the rotating field. Preferably the primary drive machine is a synchronous motor/generator. A synchronous motor/generator in particular has a greater efficiency than other rotary field machines. Preferably this high efficiency has a positive influence on the range of the vehicle. The mass inertia moment of a synchronous motor/generator is low in comparison with other rotary field machines. Due to this low mass inertia moment, preferably a favorable transient rotation speed behavior of the combined drive train is achieved.

In a further preferred embodiment the rotation speed of the primary drive shaft is lower than the rotation speed of the rotary field. Preferably the primary drive machine is formed as an asynchronous motor/generator. An asynchronous motor/generator can in particular be operated more easily than other rotary field machines in four-quadrant operation. Because of the easily implementable four-quadrant operation, preferably the energy recuperation on braking of the vehicle is easier, and hence the range increased. The rotation speed/torque control of an asynchronous motor/generator is simple in comparison with other rotary field machines. Due to the simplicity of this control system, preferably small and lightweight power electronics are used for the asynchronous motor/generator, and hence the overall weight of the vehicle can be kept low.

In a further preferred embodiment the primary drive machine is a transverse flux motor/generator. A transverse flux motor/generator in particular has non-linked three-phase windings arranged annular and concentric to the shaft. Preferably this gives a transverse magnetic circuit arrangement in individual circuits. A transverse flux motor/generator has a high power density and good efficiency and is therefore particularly suitable for mobile applications, preferably for a combined drive system.

In a further preferred embodiment the primary drive machine is a reluctance motor/generator. A reluctance motor/generator in particular has several electromagnetic coils distributed on the periphery which are oriented with their axes of symmetry substantially star-like on the output shaft of the reluctance motor/generator. This simple construction simplifies in particular the control of a reluctance motor/generator in comparison with rotary field machines. This simple controllability of the reluctance motor/generator leads to better transient rotation speed behavior of the combined drive train than would be possible with other electromechanical energy converters.

In a further preferred embodiment the primary drive machine is formed as a DC motor/generator. A DC motor/generator in particular has a well-known rotation speed/torque behavior which is simple to describe. The DC motor/generator is easier to control than other electromechanical energy converters. Because of this easy controllability, a combined drive system with low weight and great range can be achieved.

In a further preferred embodiment the primary drive machine is an AC motor/generator, preferably a monophase synchronous motor/generator. An AC motor/generator has a simple construction in comparison with other electromechanical energy converters. This simple construction allows a low weight of the vehicle.

Because energy conversion from electric to kinetic energy and back is possible with the electromechanical energy converter, preferably drive power which is initially supplied to the vehicle and stored therein as kinetic and/or potential energy is converted back into electrical energy at a later date and stored. Thus the fuel consumption of the vehicle is reduced and the range extended.

In a preferred embodiment the secondary drive machine is a combustion engine. A combustion engine is an energy converter in which chemically bonded energy is converted into kinetic energy. This energy conversion is preferably based on an exothermic combustion. This exothermic combustion is preferably performed as external or internal combustion.

Preferably the maximum volume of an individual combustion chamber lies in the range from 100 cubic centimeters ($cm^3$) to 2000 $cm^3$, preferably in a range from 300 $cm^3$ to 800 $cm^3$, and particularly preferably is substantially 500 $cm^3$. As a result with specific engine constructions, a particularly favorable ratio is achieved between combustion chamber volume and combustion chamber area. A preferably variable-volume combustion chamber gives a low-emission combustion.

In a preferred embodiment the secondary drive machine is formed as a reciprocating piston engine. The reciprocating piston engine preferably has a number of cylinders less than or equal to four, preferably less than or equal to three, or particularly preferably two or one. Four or two cylinders have the advantage of good mass balance. With three cylinders there is a favorable ignition interval. Preferably the cylinders of the reciprocating piston engine move in one plane and/or opposite each other. Preferably with this opposing movement, the mass forces resulting substantially from the piston movement are compensated without additional masses.

Particularly preferably such a reciprocating piston engine is designed as a two-cylinder boxer engine or as a V-engine with a cylinder bank angle of substantially 180°.

If a smaller and hence lighter reciprocating piston engine is used, the weight of the combined drive system remains low and thus a greater range of the vehicle is promoted.

In a further preferred embodiment the secondary drive machine is a combustion engine with a freely moving piston, wherein this piston moves within a cylinder. This movement of the piston is preferably substantially not influenced externally. Substantially this piston can therefore move without external mechanical forced guidance. Such a combustion engine with freely moving piston is preferably a free-piston engine. To balance the resulting mass forces of a piston of the free-piston engine, preferably a second piston with opposite movement is used or preferably another suitable device. A free-piston engine constitutes a compact drive machine with high efficiency and low weight.

In a further preferred embodiment the secondary drive machine is a rotary piston engine, preferably a Wankel engine. Preferably the rotary piston engine has one or two rotary pistons. With a rotary piston engine, preferably quiet running of the secondary drive machine is achieved so that preferably only light additional devices are provided for damping vibrations and noise of the secondary drive machine. Thus preferably a low weight of the combined drive system is achieved and hence low fuel consumption.

In a further preferred embodiment the secondary drive machine is a turbo-engine or turbo-machine with internal combustion. A turbo-engine or turbo-machine with internal combustion has at least one compressor and one combustion chamber. Preferably the secondary drive machine is a gas turbine. A gas turbine allows preferably a low-vibration conversion of the chemically bonded energy into mechanical energy. In comparison with other combustion engines, the gas turbine has in particular a favorable emission behavior and high power density.

In a further preferred embodiment the secondary drive machine is a turbo-engine with external combustion. Such a turbo-engine has at least one first region in which chemically bonded energy is converted into thermal energy and transmitted to a working medium, and a second region in which the energy is at least partly extracted again from the working medium. Preferably the secondary drive machine with external combustion is a steam turbine with steam generator. With a steam turbine preferably a low-vibration conversion of the chemically bonded energy into mechanical energy can be achieved. In comparison with other combustion engines, the steam turbine in particular has a favorable emission behavior.

In a further preferred embodiment the secondary drive machine is a thermal engine with external combustion. At least two types of such thermal engines with external combustion can be distinguished on the basis of the charge-change behavior. Firstly the conversion of thermal to mechanical energy can take place via a charge change. Secondly the conversion of thermal to mechanical energy can take place without a charge change. If the thermal energy is converted into mechanical energy without a charge change, the secondary drive machine substantially has at least one cavity with at least two regions. In a first region of this cavity, thermal energy is supplied to a working medium, and in the second region of this cavity, thermal energy is extracted from the working medium. Preferably such a thermal engine without charge change is a hot gas engine, in particular a Stirling engine.

In a further preferred embodiment the thermal energy is converted into mechanical energy in a thermal engine with external combustion and with a charge change. Such a thermal engine preferably has at least one cylinder, at least one piston and a working medium. Preferably this piston is set in motion in the cylinder by the working medium. With this piston movement, preferably the working medium is expelled from the cylinder regularly. Preferably such a thermal engine is a piston steam engine.

The drive power required additionally in discontinuous driving situations, such as for example when pulling away or overtaking, can advantageously be provided in a combined drive system by the primary drive machine while the secondary drive machine is preferably operated at its optimum operating point with low pollutant emissions.

In a preferred embodiment the secondary drive machine and in particular a combustion engine has a starter device. Preferably a starter device is an electromechanical energy converter, in particular a starter. Preferably the starter device can be operated independently of the primary drive machine. Preferably the secondary drive machine is accelerated to a specific rotation speed by the starter device.

In a preferred embodiment a motor vehicle with a combined drive system preferably has on the level a primary range in the region of substantially 10 km to 400 km, preferably substantially 20 km to 200 km and particularly preferably substantially 40 km to 100 km and quite particularly preferably substantially 100 km.

The primary range is the range which the motor vehicle achieves when no external energy is supplied to the motor vehicle and the secondary drive machine is not used to generate energy.

In a preferred embodiment the electrical energy is stored preferably in chemically bonded form in an electrical energy storage device. This electrical energy storage device is preferably designed as a secondary battery (i.e. accumulator). The electrical energy storage device preferably has a storage capacity of substantially 2 to 80 kWh, preferably substantially 3 to 30 kWh and particularly preferably substantially 4 to 10 kWh.

In a preferred embodiment energy can be supplied to the motor vehicle with combined drive system from outside the vehicle. Preferably this energy which can be supplied is electrical energy. Preferably the motor vehicle has an interface for the supply of electrical energy. The energy supply takes place preferably conductively, in particular via a plug connection, or also preferably inductively, preferably when the vehicle has stopped or also when it is moving, in particular via induction devices arranged in, next to or above the roadway. This induction device preferably comprises electrical conductors.

In a preferred embodiment the primary and secondary drive machines are substantially operated in a range with a high efficiency. The efficiency of the drive machines usually depends on the rotation speed of their drive shaft. To adapt the rotation speeds of the drive shafts to the travel speed and the efficiency requirements, the combined drive system preferably has a gear mechanism, preferably with several fixed translation stages. A translation stage is preferably characterized by the ratio of rotation speeds between at least one gear input element and at least one gear output element. Preferably this gear mechanism has four, preferably three and particularly preferably two translation stages.

In a further preferred embodiment the gear mechanism is designed as an epicyclic gear. An epicyclic gear is preferably a planetary gear mechanism with preferably three shafts which preferably comprise a sun wheel, a ring gear, a planet carrier and at least one planet. These three shafts of the planetary gear mechanism are preferably constituted by the sun wheel, the ring gear and the planet carrier.

When a planetary gear mechanism is used, the primary drive shaft can optionally be connected directly or indirectly with the sun wheel and/or the planet carrier. The secondary drive shaft preferably drives the planet carrier and/or sun wheel or is decoupled from the planetary gear mechanism. The connection of the primary drive shaft with the sun wheel and/or planet carrier is preferably influenced by at least one torque transmission means. The power flow from the secondary drive shaft to the planet carrier and/or sun wheel is preferably influenced by a torque transmission means.

Preferably the ring gear of the planetary gear mechanism serves as a gear output element.

In a further preferred embodiment the gear mechanism is also designed as a planetary gear. The planet carrier here serves as a gear output element. Preferably the ring gear is mounted rotationally fixed and cannot execute a rotary movement about its center axis. Preferably the primary drive shaft can be connected optionally with the sun wheel and/or with the planet carrier. Preferably the secondary drive shaft optionally drives the sun wheel or does not transmit power to the planetary gear mechanism. The connection of the primary drive shaft with the sun wheel and/or planet carrier is preferably influenced by at least one torque transmission means. The power flow from the secondary drive shaft to the planet carrier is preferably influenced by a torque transmission means.

In a further preferred embodiment a motor vehicle with combined drive system comprises a gear mechanism with at least one translation stage with a high efficiency. Preferably this gear mechanism is designed as a planetary gear. In a planetary gear mechanism preferably at least two shafts can be connected together. These shafts are preferably constituted by the sun wheel or sun wheel shaft, the ring gear or ring gear shaft and the planet carrier. Preferably the ring gear can be connected with the sun wheel or preferably the ring gear with the planet carrier or the sun wheel with the planet carrier. The planetary gear mechanism in particular has a high efficiency when two of these shafts move with the same rotation speed and the translation ratio between a gear input element and a gear output element of the planetary gear mechanism is 1:1.

In a further preferred embodiment the motor vehicle with combined drive system has a gear mechanism with variable rotation speed ratio. The gear mechanism preferably has a first gear input rotation speed, a second gear input rotation speed and a gear output rotation speed. The rotation speed ratio between the second gear input rotation speed and the gear output rotation speed is preferably determined by the first gear input rotation speed. Preferably the second gear input rotation speed is overlaid with the first gear input rotation speed. With this speed overlay preferably a continuous adjustment of the speed ratio is possible. The gear mechanism with variable rotation speed ratio has at least one first gear input element, a second gear input element and a gear output element. The first gear input element can preferably be connected with the primary drive shaft. The second gear input element can preferably be connected with the secondary drive shaft. Via the continuously adaptable speed ratio, preferably the secondary drive machine can be operated in an operating range with high efficiency. By operation in an operating range with high efficiency, preferably a low emission operation of the motor vehicle is possible.

In a preferred embodiment the primary drive shaft and secondary drive shaft are arranged coaxially and/or aligned to each other. With this manner of shaft orientation preferably a simple construction of the combined drive system is possible. With the simple and hence weight-saving construction of the combined drive system, preferably efficient operation of the motor vehicle is achieved.

In a preferred embodiment the power is transmitted from the primary drive shaft to a drive element of the vehicle or vice versa without conversion. Preferably the power is transmitted without conversion from the secondary drive shaft to at least one drive element of the vehicle.

Conversion-free transmission of power means that a mechanical power is not converted during transmission into another form of power, in particular not into electrical power. The mechanical power is preferably transmitted conversion-free when the product of the torque and rotation speed remains substantially constant during transmission. Preferably the secondary drive shaft can be connected via a gear mechanism and/or via a torque transmission means with a drive element of the vehicle, hence preferably a complete mechanical through-drive created and high efficiency achieved for the combined drive system.

In a preferred embodiment the torque flows of the combined drive system can be influenced by torque transmission means to give a high efficiency of the drive system. For this the combined drive system preferably has one, two, three or more torque transmission means.

Preferably the torque transmission means are selected from a group of various types of torque transmission means. This group comprises mechanical clutches and brakes which at least partly transmit forces based on solid body friction or based on hydrodynamic or hydrostatic effects, and/or contactless clutches and brakes which transmit forces on the basis of mechanical or electrical effects.

Mechanical clutches and brakes are preferably those clutches which work on the principle of form-fit or friction engagement. Friction engagement clutches can be classed in particular by the form of the friction surface. Preferably the group of mechanical clutches comprises jaw, cone, disk (single disk, multidisk and multiplate) and looped band clutches, and both wet- and dry-running torque transmission means.

Here the torque transmission means can also be slip-controlled. Slip means the twisting of the input side of the torque transmission means in relation to the output side. The couplings and brakes can furthermore be selected from the group of hydraulic clutches. Hydraulic clutches include in particular hydrodynamic torque converters with and without bridging coupling. Hydraulic clutches are preferably also clutches which transmit torque partly on the basis of the shear friction of fluids. Preferably hydraulic clutches can have a fill quantity control.

A mechanical clutch or brake can have filling with a ferromagnetic medium. The flow of a current leads to a magnetic flux which changes the properties of the ferromagnetic medium. Preferably the group of magnetic torque transmission means also comprises magnetic powder clutches and brakes.

Preferably the group of contactless torque transmission means comprises clutches and brakes in which, via a permanent magnetic or electromagnetic region of the torque transmission means, an electric current and/or magnetic flux is induced in another region of the torque transmission means, in particular an eddy current. Preferably via this induced current the two regions exert forces on each other. Preferably in this way a torque can be transmitted from the input side to the output side of the torque transmission means.

Preferably the group of contactless torque transmission means comprises clutches and brakes which are filled at least partly with a medium which, via the application of a voltage, changes the torque transmission behavior of the torque transmission means. Preferably the group of contactless torque transmission means comprises clutches and brakes which contain electro-rheological fluids.

Preferably a torque transmission means can be selected from the group of overrun clutches. Overrun clutches are in particular free-wheel mechanisms. A free-wheel mechanism is a device which allows the rotation of an element of the combined drive system in only one direction of rotation. Preferably these can be switchable and non-switchable free-wheel mechanisms. Such a switchable free-wheel mechanism in particular has two operating states. In a first operating state the free-wheel mechanism allows a rotary movement of an element of the combined drive system preferably only in at least one direction of rotation. In this operating state the free-wheel mechanism exercises a blocking effect. In a second operating state, via a control command the blocking effect of the switchable free-wheel mechanism can be eliminated for at least one direction of rotation.

Free-wheel mechanisms can be differentiated in particular by the manner in which they achieve their blocking effect. Preferably free-wheel mechanisms can be classed in groups with form-fit and friction engagement blocking functions.

The group of form-fit free-wheel mechanisms comprises ratchet free-wheel mechanisms with internal or external toothing, and tooth or claw-type clutches activated depending on rotation direction.

The group of friction engagement free-wheel mechanisms includes free-wheel mechanisms with axial and radial clamping function. The group of free-wheel mechanisms with radial clamping function comprises clamping roller free-wheel mechanisms with internal or external star, clamping body free-wheel mechanisms, spring band free-wheel mechanisms. The group of free-wheel mechanisms with axial clamping function comprises axial free-wheel mechanisms such as helical friction clutches and axial free-wheel mechanisms with cone.

Free-wheel mechanisms can also be constructed from a combination of said function principles. Said clutches are well-known torque transmission means today. By the use of these torque transmission means, in particular from at least one of said groups, a combined drive system can be constructed quickly.

In a preferred embodiment the torque transmission from the secondary drive shaft to an output device can be influenced, preferably interrupted. This interruption of the torque transmission is achieved in particular by a torque transmission means. The torque-transmitting connection between the secondary drive machine and the output device can in particular have two states.

In a first state preferably a torque is transmitted from the secondary drive machine to the output device. In a second state preferably no torque is transmitted from the secondary drive machine to the output device.

In this second state preferably the entire or at least the predominant part of the energy stored in the vehicle can be transmitted to the primary drive machine. This achieves that the energy stored in the vehicle can at least partially be stored in the energy storage device. Thus in particular the range of the motor vehicle can be extended and the emissions caused reduced.

In a further preferred embodiment the torque transmission means between the secondary drive machine and the output device is formed as an overrun clutch. Preferably this torque transmission means is a free-wheel mechanism and particularly preferably a switchable free-wheel mechanism. Preferably a free-wheel mechanism achieves that the secondary drive machine transmits power to the output device only in the case when the rotation speed of the secondary drive shaft is greater than the rotation speed of an input element of the output device. A power flow from the output device to the secondary drive machine is prevented in particular by a free-wheel mechanism, preferably by a switchable free-wheel mechanism. By a free-wheel mechanism between the secondary drive machine and the output device, preferably the possibilities for controlling the combined drive system are improved.

In a preferred embodiment a gear shaft of a gear mechanism is held rotationally fixed i.e. this gear shaft can no longer rotate in relation to another element, in particular in relation to the gear casing. A gear shaft is in particular a sun wheel or sun wheel shaft, a ring gear or ring gear shaft, a planet or planet shaft, or a planet carrier. This gear shaft is preferably held rotationally fixed by a torque transmission means. Preferably this torque transmission means is a multiplate brake. By holding a gear shaft rotationally fixed, in particular the rotation speed ratio of a gear mechanism can be influenced. An operation of the combined drive system with low fuel consumption and large range is achieved via the possibility of influencing the rotation speed ratio of a gear mechanism.

In a preferred embodiment a gear shaft of a gear mechanism is connected with a second gear shaft, whereby the two gear shafts have the same rotation speed. The two gear shafts are preferably connected by a torque transmission means. By connecting the two gear shafts together in particular the rotation speed ratio of a gear mechanism can be influenced.

In a preferred embodiment, in particular between the secondary drive machine and the output device, at least one torsional vibration damper is arranged which is intended to reduce torsional vibrations. A torsional vibration is in particular a mechanical vibration which takes place about a degree of freedom of a rotary system. By damping the torsional vibrations, dynamic stresses on the devices of a combined drive system are reduced, the NVH behavior is improved and the comfort for the user increased.

The torsional vibration damper or dampers are preferably selected from a group of mechanical and/or electric torsional vibration dampers which damp vibrations using different physical effects. In particular a torsional vibration damper reduces the amplitude of the torque vibration which is applied by the secondary drive machine onto the output device. Preferably the torsional vibration damper reduces the amplitude of this torque vibration by more than 10%, preferably by more than 50% and in particular by more than 90%.

The group of preferred torsional vibration dampers include preferably single, dual, triple or multiple mass flywheels in which preferably the resonance behavior is also used for damping. Furthermore the group includes torsional vibration absorbers which preferably damp a torsional vibration by generating a mechanical vibration with a specific phase relationship to this torsional vibration. Preferably the mechanical vibration of the torsional vibration absorber is substantially contraphase to this torsional vibration.

The group of preferred torsional vibration dampers also includes torsional vibration dampers with a variable resonant frequency. Preferably the resonant frequency of a torsional vibration damper can be varied by a centrifugal force pendulum and/or by another device which responds to the rotation speed of the torsional vibration damper.

The group of preferred torsional vibration dampers also includes dampers in which torsional vibrations are damped by an electromechanical actuator device. Preferably an electromechanical actuator device and/or the primary drive machine generates a mechanical vibration with a specific phase relationship to this torsional vibration.

Using these electromechanical torsional vibration dampers, preferably compensation vibrations can also be generated as already explained in relation to the primary drive machine. The data used for this can be either data from the engine control unit and/or data obtained from vibration sensors arranged at one or more points on the drive train to receive vibrations. It is also possible alternatively or additionally to determine the vibrations in the electrical field of the primary drive machine. From these determined vibrations, compensation vibration movements can be calculated which are then generated by torsional vibration dampers.

Such an active torsional vibration damping is advantageous in particular if a combustion engine is used as a secondary drive machine which only has two or even only one cylinder and is designed as a reciprocating piston engine.

The group of preferred vibration dampers also includes dampers which apply as a physical function principle the internal friction of elastic materials. In particular elastomer dampers damp vibrations with the internal friction of an elastic material.

The group of preferred torsional vibration dampers furthermore includes dampers which as a physical function principle apply the fluid friction or flow resistance of a fluid. Preferably gas pressure dampers and visco-dampers damp vibrations with fluid friction, in particular by flow resistance.

According to the invention a motor vehicle with a combined drive system has a second energy storage device, in particular for storing energy for the secondary drive machine.

Energy is stored in this second energy storage device preferably in the form of chemically bonded energy.

The chemically bonded energy is preferably bonded in a liquid, gaseous or solid fuel. The fuel is preferably stored under a storage pressure which is increased in relation to ambient pressure, or preferably under the storage pressure which substantially corresponds to the ambient pressure. The fuel preferably contains at least proportionally hydrocarbon. Such a fuel preferably has at least one proportion of petrol, diesel, turbine fuel (petroleum), vegetable oil, esterized vegetable oil (biodiesel), alcohol (methanol, ethanol, butanol) and benzene, liquid gas (liquefied natural gas, liquefied petroleum gas), Xtl fuel (coal, gas, biomass to liquid), natural gas (compressed natural gas), methane, ethane, biogas (synthetic natural gas), dimethylether and hydrogen, or a mixture of at least two of these fuels. This fuel is preferably stored in a container and preferably converted into thermal energy in an exothermic reaction, wherein this thermal energy can be used preferably indirectly to drive the motor vehicle and/or to temper the motor vehicle.

Because of the presence of a store of fuel, to generate thermal energy preferably no energy is taken from the energy storage unit connected with the primary drive machine, whereby the primary range is extended.

In a preferred embodiment different devices of the combined drive system have a common temperature-conductive connection. In a combined drive system thermal energy is produced at various devices. This thermal energy is produced in particular in operation of a primary drive machine, a secondary drive machine, a gear mechanism, an energy storage device and a control device to control the combined drive system.

The different devices of a combined drive system have an efficiency depending in particular on temperature. In particular the efficiency of an energy storage device is low if it is operated at a low temperature. In particular at the control device, thermal energy is produced on the basis of an efficiency of less than one. Via the temperature-conductive connection preferably thermal energy can be transmitted from the control device to the energy storage device. The thermal energy is transmitted preferably to a fluid for temperature conduction. This fluid is preferably conducted through an open or closed device. The conduction of the thermal energy is then preferably oriented towards thermal energy being extracted from a device at which it is produced and supplied to a device which achieves a better efficiency at a temperature which is higher than its present temperature.

In particular by the transmission of thermal energy from the control device to the energy storage device, preferably the efficiency thereof is increased and hence the efficiency of the combined drive system and hence the range of the motor vehicle increased.

In a preferred embodiment the combined drive system has at least one primary drive machine, a secondary drive machine and a gear mechanism. Preferably a common fluid stream flows through or against at least two of these components or all of them. With this common fluid stream preferably thermal energy is transmitted from at least one of these components to at least one other. The fluid of the common fluid stream is preferably a lubricating oil, preferably a mineral or a synthetic oil. Via a common thermal and/or lubricant circuit, preferably a drive system is achieved with low weight and high efficiency.

In a preferred embodiment the reversal of travel direction of the motor vehicle is achieved by reversing the direction of rotation of the primary drive machine. The omission of a reverse gear implemented by gear ratios saves weight and hence preferably a great range of the motor vehicle can be achieved.

In a preferred embodiment a gear shaft connected in particular directly or indirectly with the output device is held rotationally fixed by a torque transmission means. Preferably this gear shaft can also be held non-rotationally fixed by the torque transmission means. This torque transmission means is preferably a self-locking torque transmission means or a torque transmission means in which no external force is supplied to maintain at least one operating state. A self-locking torque transmission means is a torque transmission means which transmits torque without the action of an external force. This torque transmission means is preferably a catch connection or a claw-type clutch. With a self-locking torque transmission means in particular a parking brake can be implemented in a simple and energy-efficient manner and hence an improved drive system produced.

A method for operating a combined drive system for a motor vehicle serves preferably for achieving a high energy efficiency with simultaneously good driving performance. The combined drive system has at least one primary drive machine, a secondary drive machine, an energy storage device and an output device. With this method at least the following operating states of the combined drive system are implemented:

- the powers of the secondary drive machine and the primary drive machine are used jointly to drive the vehicle, wherein the secondary drive machine is mechanically coupled into the drive;
- the secondary drive machine provides drive and the primary drive machine is driven via the primary drive shaft and the energy generated thereby is stored at least partially;
- the primary drive machine provides drive and the secondary drive machine is stopped;
- the primary drive machine is driven via the primary drive shaft and the secondary drive machine is stopped or at idle.

This method sets the combined drive system into different operating states preferably as a function of various peripheral conditions. Preferably the operating state of the combined drive system and the operating requirements from the user are taken into account in controlling the combined drive system with a control device. Such peripheral conditions are in particular the charge state of the energy accumulator, the driving wish of the user such as for example acceleration or travel speed, information on the route to be covered such as for example uphill and downhill gradient and distance, and information on other environmental influences such as ambient temperature.

In a preferred embodiment this method is executed by at least one control device. A control device is preferably a device which has at least one calculator unit to compare data. Preferably a control device has at least one data storage unit for storing data and at least one device for reading or inputting data. This control device preferably directly or indirectly determines at least one of the following parameters:

- the rotation speed and/or acceleration of the primary drive shaft, and/or
- at least one temperature of the primary drive machine, and/or
- the rotation speed and/or acceleration of the secondary drive shaft, and/or
- at least one temperature of the secondary drive machine, and/or
- the rotation speed and/or acceleration of the output device, and/or
- the rotation speed and/or acceleration of at least one gear input shaft, and/or
- at least one temperature of the gear mechanism, and/or
- the rotation speed and/or acceleration of at least one drive element of the vehicle, and/or
- the rotation speed and/or acceleration of the secondary drive machine, and/or
- the fill level of at least one energy storage device, and/or
- at least one temperature of at least one energy storage device, and/or
- at least one current intensity and/or voltage of at least one energy storage device, and/or
- the rate of pitch, and/or
- the rate of roll, and/or
- the rate of yaw, and/or
- at least one distance from at least one other traffic participant, and/or
- at least one suspension compression state of a suspension device.

In the control device or data memory are stored in particular information on the individual components of the combined drive system. Preferably such information includes data on technical data, preferably on the efficiency of the components of the combined drive system.

Furthermore the control device can preferably also process information which is supplied externally by radio from external transmitters and in particular from the internet. This information contains preferably data on the present and expected traffic situation, in particular on traffic jams, weather, weather development and similar.

Preferably the combined drive system is controlled taking into account the values detected. Preferably the parameters are detected, compared with stored data and a control command produced.

By taking into account in particular several parameters in the control of the combined drive system, operation of the drive system with low emissions and low fuel consumption is achieved.

In a preferred embodiment the difference is determined between the rotation speed of the secondary drive shaft and the rotation speed of a gear input shaft or the rotation speed of the primary drive shaft. In particular these rotation speeds are compared. If the difference is greater than or equal to zero, in particular the power of the secondary drive machine is transmitted to the output device. This power transmission is achieved in particular by a torque transmission means. The torque transmission means is in particular activated or engaged after comparison of the rotation speeds and on a rotation speed difference which is substantially zero or greater than zero.

In a preferred embodiment in particular the charge state of the energy storage device is determined. Preferably a power flow from the secondary drive machine to the primary drive machine is permitted only when the charge state of the energy storage device falls below a limit value stored in the control device. Preferably this limit value is dependent on at least one of the following parameters:

- the route, for example uphill and downhill sections and the distance remaining to destination,
- the charge state of the energy storage device, in particular the energy quantity still available, or
- the operating state of at least one drive machine, in particular at least the rotation speed or the torque.

Preferably the power flow from the secondary drive machine to the primary drive machine is controlled such that the secondary drive machine is operated by the additionally emitted power in a range with more favorable efficiency.

By shifting the operating state of the secondary drive machine towards more favorable efficiency, preferably lower emission operation of the combined drive system is achieved.

BRIEF DESCRIPTION OF THE DRAWINGS

Further features, benefits and embodiments of the present invention arise from the following description of the enclosed Figures.

These show.

DETAILED DESCRIPTION OF THE INVENTION

Figure 1:
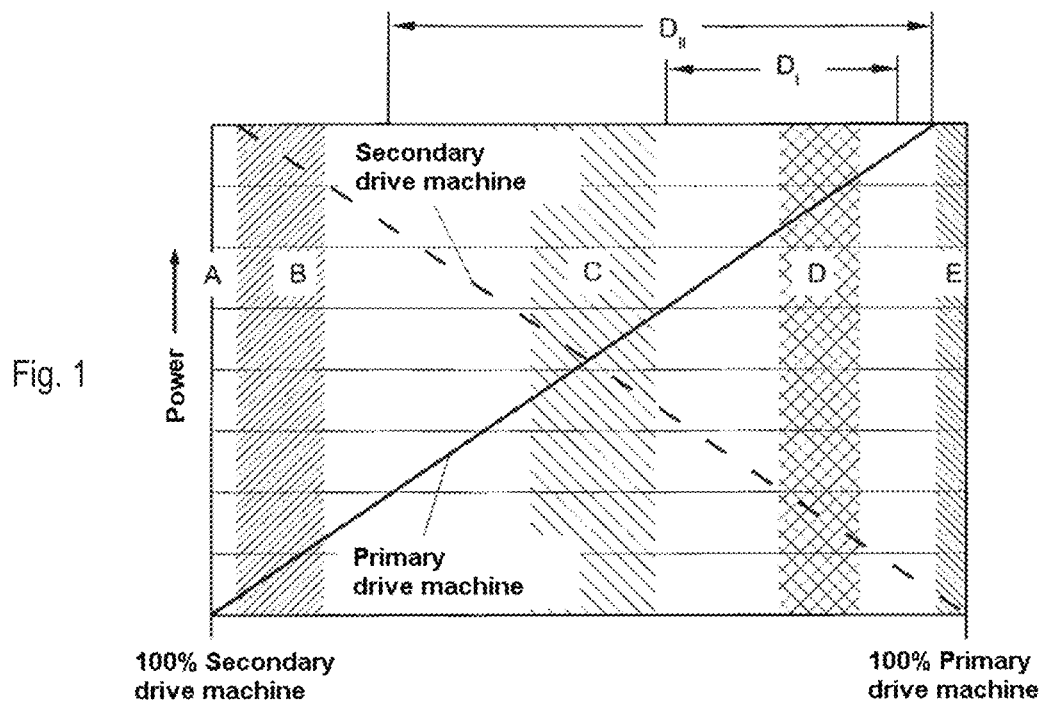
FIG. 1 a characterization of drive systems based on the installed power of the primary drive machine and secondary drive machine.

FIG. 1 shows the characterization of combined drive systems wherein this characterization is oriented on the basis of the distribution of the total drive power between the primary drive machine and the secondary drive machine. On the basis of this classification, four drive systems can be characterized today.

Group A contains conventional motor vehicles today with a combustion engine substantially without electric drive machine. In these vehicles with combustion engine, the entire power necessary for drive is provided by the combustion engine which is here designated the secondary drive machine. In such vehicles today there is already a slight degree of electrification, for example due to the alternator and the electric starter. The right-hand side of FIG. 1 in the area marked E shows motor vehicles with purely electric drives. In these motor vehicles the entire power necessary for drive is provided by an electromechanical energy converter which is here designated the primary drive machine.

In the region marked B in FIG. 1 are the conventional hybrid drives used today. These hybrid drives in relation to power use smaller electric motors in conjunction with larger combustion engines. Typically the electric motor of such a hybrid drive has a power of 15 kW to 30 kW. Such vehicle concepts are today also known as micro or mild hybrids.

Region C of FIG. 1 shows the so-called full hybrid drive concepts in which the electric drive machine and the combustion engine are approximately the same size in terms of power. These drive concepts lead to a relatively complex drive system as two drive machines of approximately the same size are combined.

The region marked $D_{II}$ in FIG. 1 is the region in which a combined drive system according to the invention can be classed. Preferably the primary drive machine of the drive concept according to the invention is larger in terms of power than the secondary drive machine. This characterization is indicated in region $D_I$ which is smaller than region $D_{II}$. In a particularly preferred embodiment the combined drive system according to the invention has a power distribution between the secondary drive machine and the primary drive machine which is characterized by region $D_I$. Here the primary drive machine is larger than the secondary drive machine. This power distribution leads to a compact, lightweight and highly efficient drive system.

Figure 2:
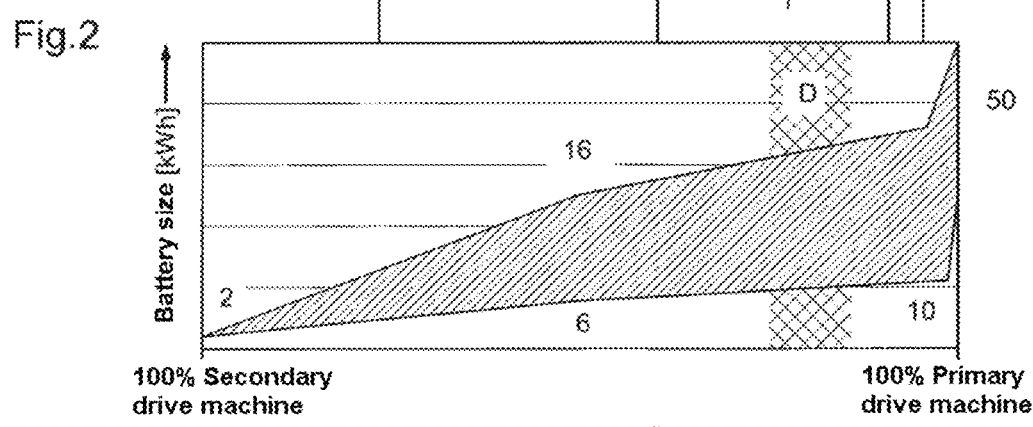
FIG. 2 the energy content of the electrical energy storage device for different combined drive systems.

FIG. 2 shows the preferred storage capacity, also known as the battery size, of the electrical energy storage device for a combined drive system over the power distribution between the secondary drive machine and primary drive machine. It is preferably assumed that the battery size is between 2 and 50 kWh. FIG. 2 shows that the decisive factor for battery size is the distribution of drive power between the secondary drive machine and primary drive machine. The larger the primary drive machine and the smaller the secondary drive machine, the larger the battery capacity.

The electrical energy storage device is a device which for system reasons has a high specific weight. As a result the vehicle weight increases greatly as the electrical energy storage devices become larger. FIG. 2 shows that the battery capacity of a drive system according to the invention is between 4 kWh and 20 kWh. It is clear from FIG. 2 that the battery capacity of electric vehicles common today, i.e. with 100% primary drive machine, is between 20 kWh and 60 kWh, wherein these motor vehicles for system reasons have a higher weight than a motor vehicle according to the invention. In relation to vehicle weight, a combined drive system therefore constitutes an efficient solution for driving a motor vehicle, in particular when this vehicle must be able to be operated emission-free for longer distances.

Figure 3:
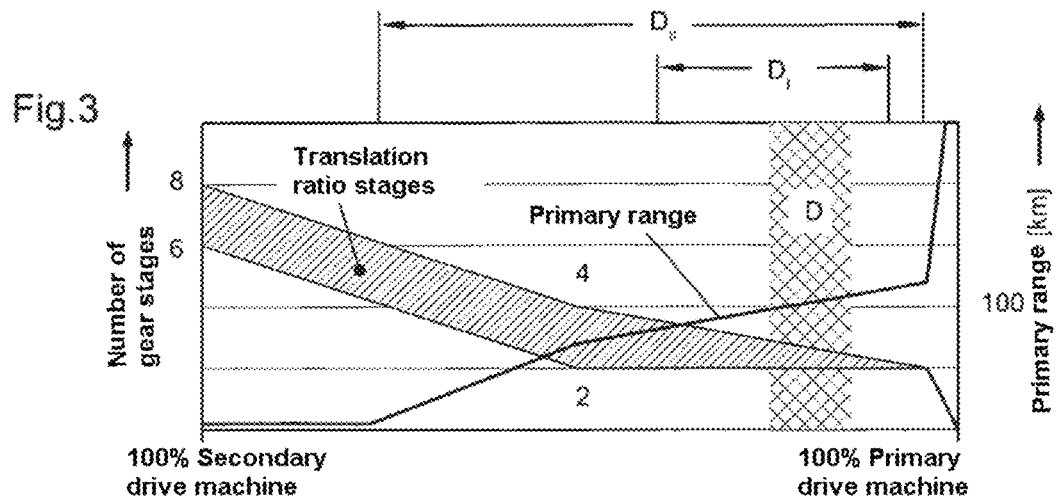
FIG. 3 the number of translation stages and the range which can be achieved with the primary drive machine for combined drive systems.

FIG. 3 shows the number of gear stages of a gear mechanism normally used today and the primary range, both over the power distribution between the secondary and primary drive machines for a motor vehicle with combined drive system. FIG. 3 shows that motor vehicles normally used today with purely combustion engine drive (100% secondary drive machine) have between 6 and 8 gear stages. Motor vehicles common today with purely electric drive (100% primary drive machines) however usually have gear mechanisms without gear stages. FIG. 3 shows that the combined drive system according to the invention is advantageously produced with two to four gear stages. Thus a primary drive machine can be used which outputs its drive power with high rotation speed and low torque on continuous travel of the vehicle. This power development allows a small and lightweight primary drive machine to be used.

To start from a standstill or to overcome great starting resistances such as for example when driving over a curbstone, at least one second gear stage is available so that a motor vehicle with a combined drive system according to the invention can also be operated in these drive situations. The primary range is the range which a motor vehicle with combined drive system can cover when powered exclusively by the primary drive machine. A motor vehicle with a combined drive system according to the invention with its small and lightweight energy storage device achieves a primary range of substantially 100 km.

Figure 4:
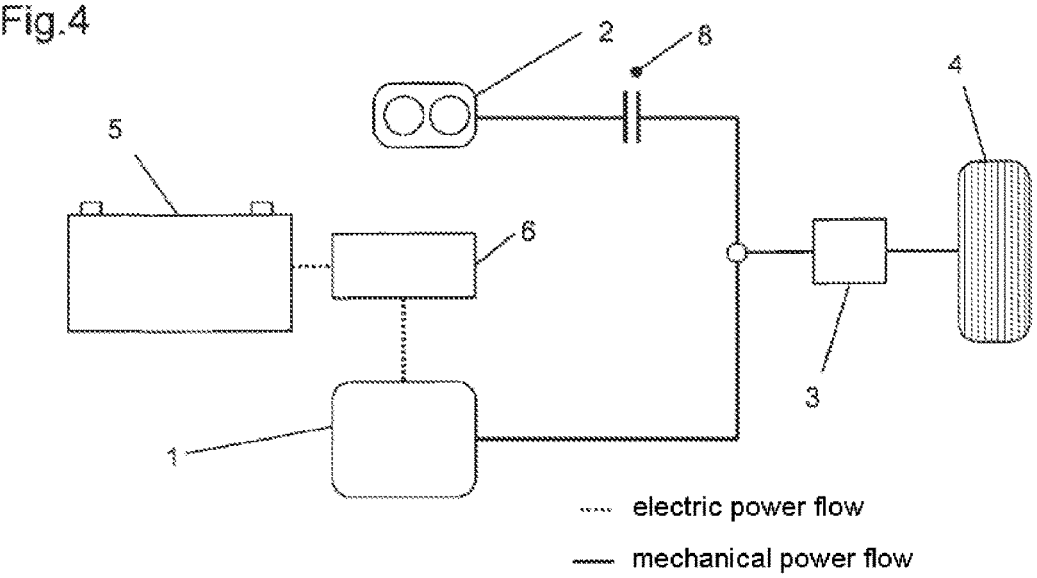
FIG. 4 an embodiment of a combined drive system with a primary drive machine and a secondary drive machine.

FIG. 4 shows the basic concept of a combined drive system according to the invention. The combined drive system according to the invention in FIG. 4 has a primary drive machine 1 with a primary drive shaft 1.1, a secondary drive machine 2 with a secondary drive shaft 2.1, an output unit 3 wherein this output unit 3 can have a selectable gear mechanism, a drive element of the vehicle 4, an energy storage device 5 and power electronics 6.

The energy storage device 5 via the power electronics 6 supplies the primary drive machine 1 with electrical energy. In the primary drive machine 1 the electrical energy is converted into drive power and output to the primary drive shaft 1.1. Via the output unit 3 the drive power of the primary drive machine 1 is conducted to the drive element of the vehicle 4. The secondary drive machine 2 can be connected via a torque transmission means 8, here preferably formed as a clutch, with the output unit 3 and the drive element of the vehicle 4. In the secondary drive machine 2, chemically bonded energy is converted into mechanical drive power and output to the secondary drive shaft 2.1.

Mechanical through-drive to the drive element of the vehicle 4 is possible from both the secondary drive machine 2 and the primary drive machine 1. This mechanical through-drive guarantees a high efficiency of the combined drive system.

Figure 5:
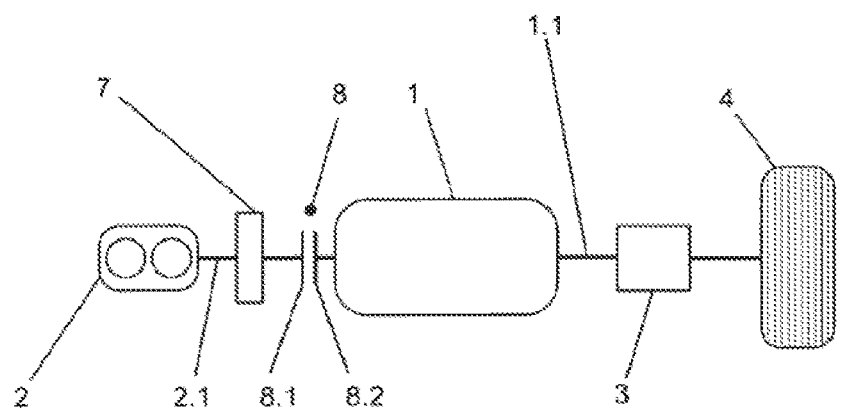
FIG. 5 an embodiment of a combined drive system with a primary drive machine oriented coaxially aligned with the secondary drive machine.

FIG. 5 shows a further embodiment example of a combined drive system according to the invention. The energy storage device and power electronics are not shown. This combined drive system according to the invention has a secondary drive machine 2, a torsional vibration damper 7, a torque transmission means 8 here preferably designed as a clutch, a primary drive machine 1 which is connected via its primary drive shaft 1.1 to the output unit 3, and a drive element of the vehicle 4.

The secondary drive machine 2 and the primary drive machine 1 are oriented coaxially aligned to each other. A torsional vibration damper 7 is mounted on the secondary drive shaft 2.1. The torsional vibration damper 7 is connected with the input side of the torque transmission means 8.1. The output side of the torque transmission means 8.2 is connected with the primary drive shaft. With this torsional vibration damper 7, mechanical torsional vibrations are damped. Thus the mechanical components between this torsional vibration damper 7 and the drive element of the vehicle 4 are under less load. Because of the reduced load, the mechanical components can be formed smaller and lighter.

With the torque transmission means 8, the power flow from the secondary drive machine 2 to the primary drive machine 1 and vice versa can be interrupted. The power flow to the secondary drive machine 2 is interrupted in particular when the vehicle is in overrun mode. This is characterized in that the drive power of the drive machine is not used to overcome the travel resistance (drive mode), but the potential and/or kinetic energy stored in the motor vehicle is conducted to at least one of the drive machines (1, 2), preferably to the primary drive machine. In the primary drive machine 1 the potential and/or kinetic energy of the motor vehicle is converted into energy which can be reused to drive the vehicle and stored in the energy storage device (not shown). By interrupting the power flow to the secondary drive machine, preferably the proportion of the energy which can be re-stored in the energy storage device is increased and hence the efficiency of the motor vehicle with the combined drive system according to the invention is increased.

Figure 6:
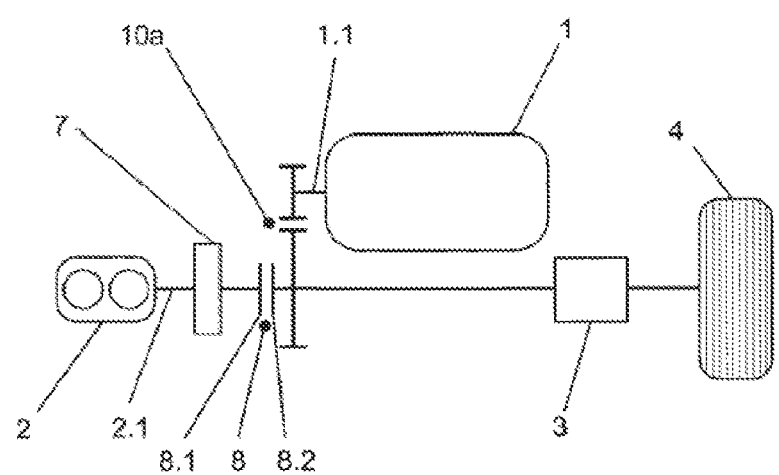
FIG. 6 a combined drive system with an adapter gear mechanism to adapt the rotation speed of the primary drive machine to the rotation speed of the secondary drive machine.

FIG. 6 shows a further embodiment example of a drive system according to the invention. The energy storage device and power electronics are not shown. This combined drive system according to the invention has a secondary drive machine 2, a torsional vibration damper 7, a torque transmission means 8 here preferably designed as a clutch, an adapter gear mechanism 10a, a primary drive machine 1, an output unit 3 and a drive element of the vehicle 4. The primary drive machine 1 in this combined drive system, in contrast to the combined drive system shown in FIG. 5, is connected with the secondary drive machine 2 via an adapter gear mechanism 10a.

The secondary drive shaft 2.1 is connected via the torsional vibration damper 7 with the input side of the torque transmission means 8.1. The output side of the torque transmission means 8.2 is connected with the adapter gear mechanism. For system reasons there is a difference between the rotation speeds at which the primary drive machine 1 and secondary drive machine 2 output their drive power with high efficiency.

With the configuration of the combined drive system shown in FIG. 6, it is possible to adapt the rotation speed of the primary drive shaft 1.1 to the rotation speed of the secondary drive shaft 2.1. Adaptation of the rotation speeds means that the primary drive machine 1 and secondary drive machine 2 can output their drive power to drive the motor vehicle in wide operating ranges close to their optimum efficiency. This rotation speed adaptation therefore gives a lightweight and efficient combined drive system.

Figure 7:
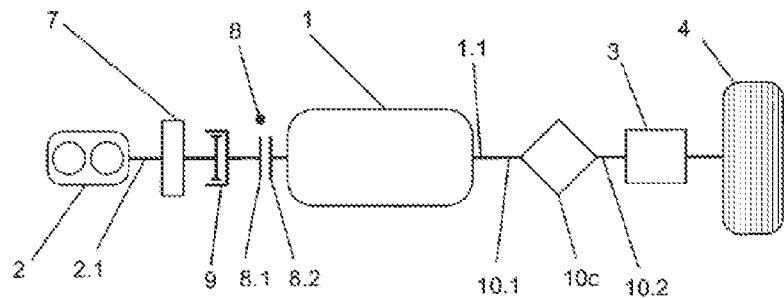
FIG. 7 a combined drive system with a torsional vibration damper, an overrun clutch and a torque transmission means between the primary drive machine and the secondary drive machine.

FIG. 7 shows a further embodiment example of a drive system according to the invention. The energy storage device and power electronics are not shown. The combined drive system shown in FIG. 7 corresponds largely to the combined drive system shown in FIG. 5. The secondary drive shaft 2.1 is coupled with the primary drive shaft 1.1 via a torsional vibration damper 7, an overrun clutch 9, a torque transmission means 8 here preferably designed as a clutch with an input side 8.1 and an output side 8.2. An overrun clutch 9 constitutes a simple manner of preventing the power flow from the primary drive machine 1 and/or drive element of vehicle 4 to the secondary drive machine 2 or vice versa.

This combined drive system has a selectable gear mechanism 10c with two translation stages, a gear input element 10.1 and a gear output element 10.2. The primary drive machine 1 is connected with the drive element of the vehicle 4 via the selectable gear mechanism 10c. The selectable gear mechanism 10c firstly gives the advantage of adapting the power development of the primary drive machine 1 and/or secondary drive machine 2 to the load demands of the motor vehicle. Secondly the benefit arises of operating the combined drive system with particularly high efficiency in a second gear stage.

The combination of an overrun clutch 9 with a torque transmission means 8 between the secondary drive machine 2 and primary drive machine 1 gives the advantage that in overrun mode, it is possible to convert the power exclusively in the primary drive machine 1 and store it in the energy storage device (not shown).

Figure 8:
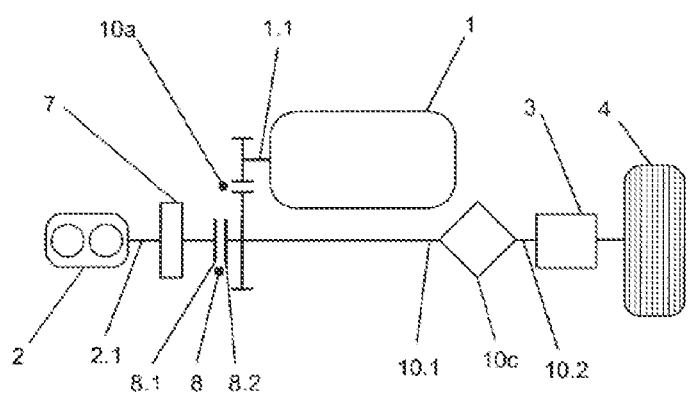
FIG. 8 a combined drive system with a selectable gear mechanism and an adaptable gear mechanism.

FIG. 8 shows a further embodiment example of a drive system according to the invention. The energy storage device and power electronics are not shown. This combined drive system according to the invention has a secondary drive machine 2, a torsional vibration damper 7, a torque transmission means 8 here preferably designed as a clutch, an adapter gear mechanism 10a, a primary drive machine 1, a selectable gear mechanism 10c, an output unit 3 and a drive element of the vehicle 4. In comparison with FIG. 6, this combined drive system has a selectable gear mechanism 10c in order preferably to be able to adapt the drive torque to the driving resistances in several stages.

The secondary drive shaft 2.1 is connected with the input side of the torque transmission means 8.1 via the torsional vibration damper 7. The output side of the torque transmission means 8.2 is connected with the adapter gear mechanism. The adapter gear mechanism 10a allows a mutual adaptation of the rotation speeds of the primary drive shaft 1.1 and the secondary drive shaft 2.1. For system reasons there is a difference between the rotation speeds at which the primary drive machine 1 and secondary drive machine 2 output their drive power with high efficiency.

With the configuration shown in FIG. 8 of the combined drive system, it is possible via the selectable gear mechanism to adapt the torque of the drive machines (2, 1) better to the load requirements from the driving resistances. This adaptation therefore gives a light and efficient combined drive system.

Figure 9:
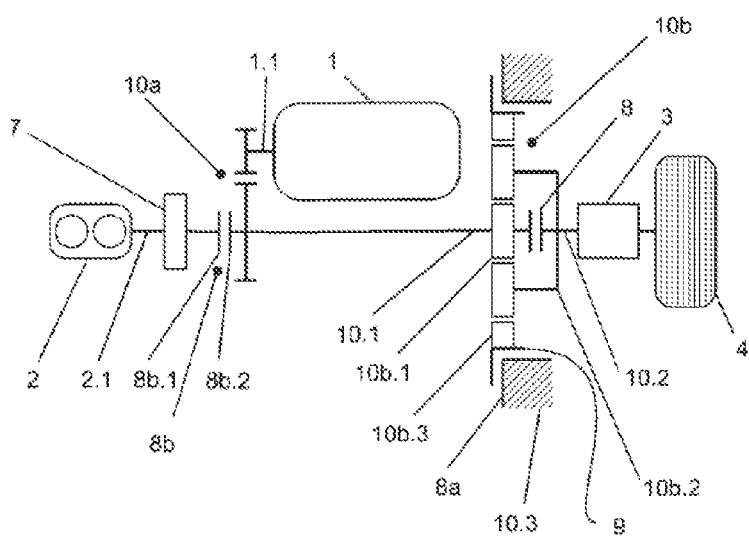
FIG. 9 a combined drive system with a planetary gear mechanism as a selectable gear mechanism with output via the planet carrier.

FIG. 9 shows a further embodiment example of a drive system according to the invention. The energy storage device and power electronics are not shown. The combined drive system shown in FIG. 9 corresponds substantially to the combined drive system shown in FIG. 8. The selectable gear mechanism is here designed as a planetary gear mechanism 10b. This has a gear casing 10.3, a ring gear 10b.3, a sun wheel 10b.1, a planet carrier 10b.2 and planets 10b.4.

The sun wheel 10b.1 can be connected with the planet carrier 10b.2 via a torque transmission means 8, here preferably designed as a clutch. By connecting the sun wheel 10b.1 with the planet carrier 10b.2, which is achieved via a torque transmission means 8, a rotation speed ratio of 1:1 is set between the gear input element 10.1 and the gear output element 10.2. The ring gear 10b.3 is supported by an overrun clutch 9 in one direction of rotation on the gear casing 10.3 of the planetary gear mechanism 10b. The gear input element 10.1 is connected with the sun wheel 10b.1. The gear output element 10.2 is connected with the planet carrier 10b.2. The ring gear 10b.3 can be connected with the gear casing 10.3 via a further torque transmission means 8a, here preferably designed as a brake device.

With the planetary gear mechanism 10b shown in FIG. 9, a selectable gear mechanism, here a two-speed gear mechanism, can be constituted in a simple manner. Here the first gear stage is provided for overcoming great travel resistances when the motor vehicle pulls away. In this first gear stage a torque transmission means 8 between the planet carrier 10b.2 and sun wheel 10b.1 is opened.

The second gear stage has a translation ratio of 1:1. This translation ratio leads to a particularly high efficiency in the power transmission. At the translation ratio of 1:1 of the planetary gear mechanism 10b, the torque transmission means 8 between the planet carrier 10b.2 and sun wheel 10b.1 is closed i.e. the planet carrier 10b.2 and the sun wheel 10b.1 cannot twist relative to each other. The secondary drive shaft 2.1 is connected via a torque vibration damper 7 with the input side 8b.1 of a further torque transmission means 8b, here preferably designed as a clutch. The output side of the torque transmission means 8b.2 is connected with the adapter gear mechanism 10a.

Figure 10:
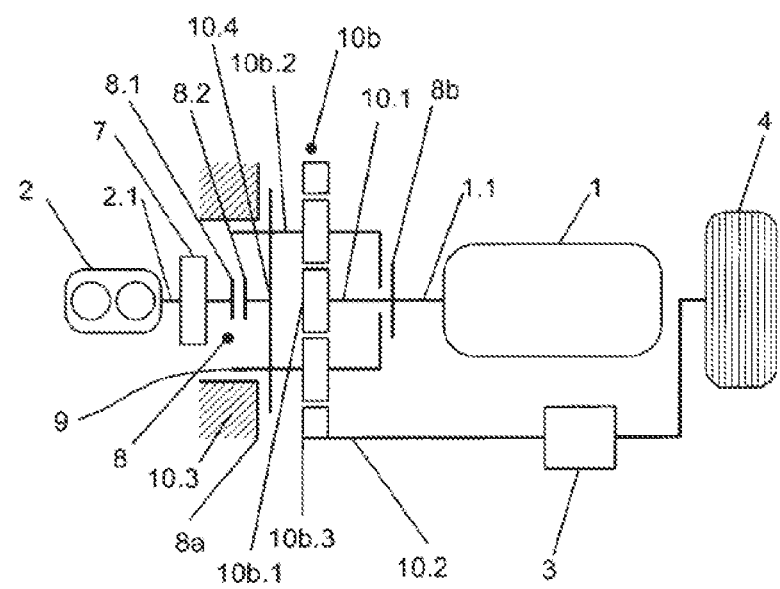
FIG. 10 a combined drive system with a planetary gear mechanism as a selectable gear mechanism with output via the ring gear, wherein the secondary drive machine can be connected with the planet carrier.

FIG. 10 shows a further embodiment example of a drive system according to the invention. The energy storage device and power electronics are not shown.

In the combined drive system shown in FIG. 10, the secondary drive shaft 2.1 can be connected with the planet carrier 10b.2 of the planetary gear mechanism 10b via a torque transmission means 8, here preferably designed as a clutch, and a torsional vibration damper 7. The input side of the torque transmission means 8.1 is connected with the torsional vibration damper 7. The output side of the torque transmission means 8.2 is connected with the second gear input element 10.4 and hence with the planet carrier 10b.2. The planet carrier 10b.2 is supported by an overrun clutch 9 in one direction of rotation on the gear casing 10.3 of the planetary gear mechanism 10b. The planet carrier 10b.2 can be connected with the gear casing 10.3 via a further torque transmission means 8a, here preferably formed as a brake device. The planet carrier 10b.2 is connected with the primary drive shaft 1.1 via a further torque transmission means 8b, here preferably designed as a clutch.

With this configuration of the combined drive system according to the invention, in a specific range a continuous adjustment of the rotation speed ratio of the planetary gear mechanism 10b is possible. The primary drive shaft 1.1 is connected with a gear input element 10.1 and hence with the sun wheel 10b.1. The drive element of the vehicle 4 is connected with a gear output element 10.2 and hence with the ring gear 10b.3.

Figure 16:
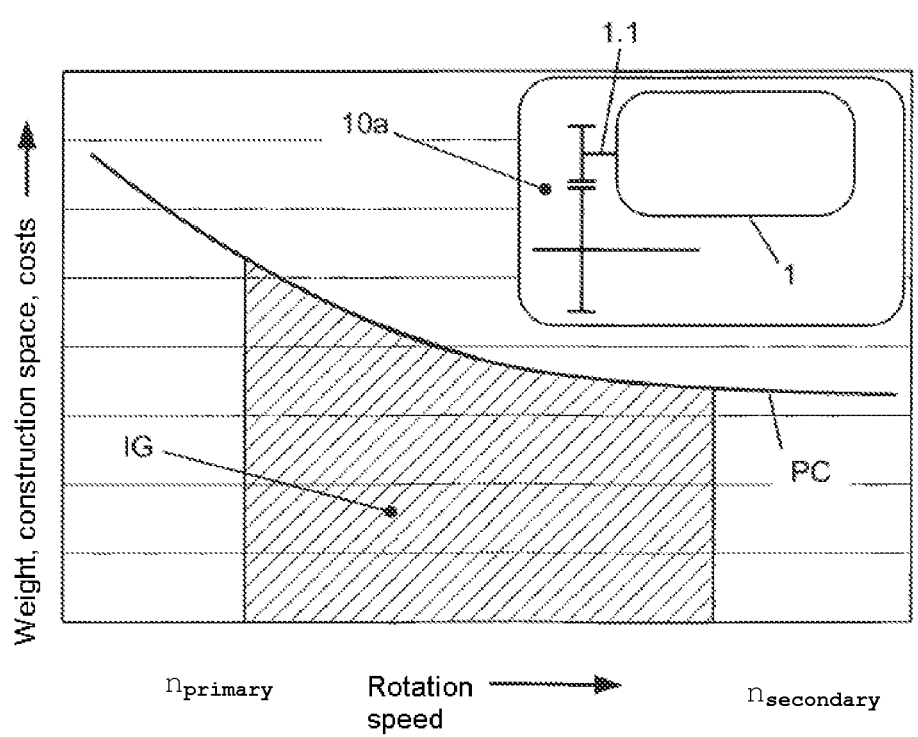
FIG. 16 the relationship between weight, construction space and costs and the rotation speed adaptation of the rotation speeds of the primary drive machine and secondary drive machine.

Due to the possibility of continuous adaptation of the rotation speed ratio by rotation speed overlay, the combined drive system can be controlled flexibly. FIG. 16 shows the corresponding rotation speed ratios for the combined drive system in FIG. 10. The variable setting of the rotation speed ratios of the planetary gear mechanism 10b allows operation of the secondary drive machine 2 through a load point shift into a favorable operating point in each case, and hence an improvement in the efficiency of the combined drive system. Also when the vehicle has stopped, the energy storage device (not shown) can be filled with energy via the primary drive machine.

Figure 11:
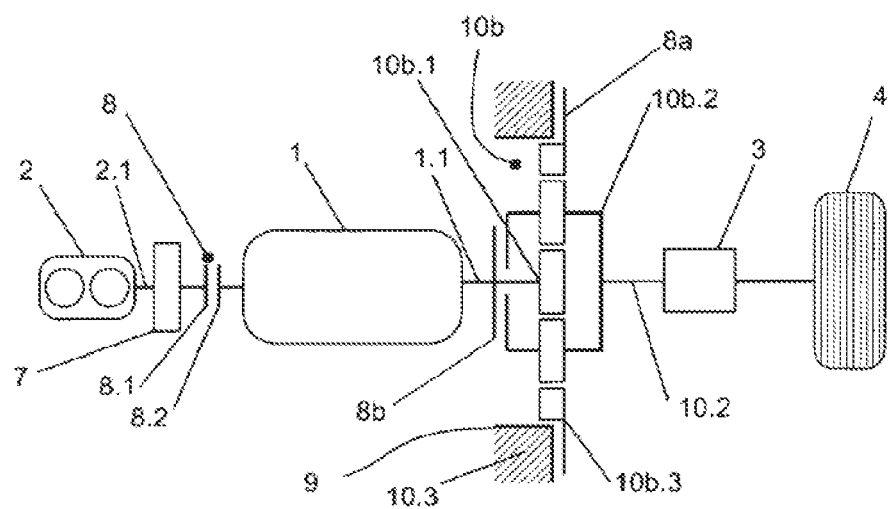
FIG. 11 a combined drive system with a planetary gear mechanism as a selectable gear mechanism with output via the planet carrier, wherein the primary drive machine and secondary drive machine are oriented coaxially aligned to each other.

FIG. 11 shows a further combined drive system. The energy storage device and power electronics are not shown. In this combined drive system the secondary drive shaft 2 can be connected via a torsional vibration damper 7 and a torque transmission means 8, here preferably designed as a clutch, with a second gear input element, here the sun wheel 10b.1, of the planetary gear mechanism 10b. The power flow between the secondary drive machine 2 and a second gear input element 10b.1 of the planetary gear mechanism 10b can be interrupted by the torque transmission means 8 with an input side 8.1 and an output side 8.2. The primary drive shaft 1.1 is connected with a gear input element 10.2 and hence with the sun wheel 10b.1 of the planetary gear mechanism 10b.

The drive element of the vehicle 4 is connected with the gear output element 10.2 and hence with the planet carrier 10b.2. The ring gear 10b.3 of the planetary gear mechanism 10b is supported via an overrun clutch 9 or via a further torque transmission means 8a, here preferably designed as a brake device, on the gear casing 10.3 of the planetary gear mechanism 10b. The primary drive shaft 1.1 can be connected with the planet carrier 10b.2 via a further torque transmission means 8b, here preferably designed as a clutch. By connecting the sun wheel 10b.1 with the planet carrier 10b.2, the planetary gear mechanism 10b can be operated with particularly high efficiency and a rotation speed ratio of 1:1, and hence a high efficiency of the combined drive system can be achieved.

Figure 12:
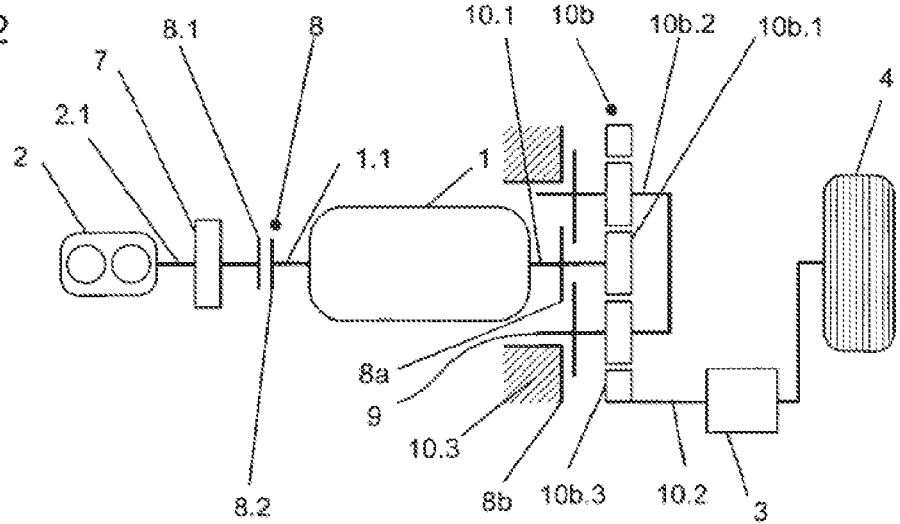
FIG. 12 a combined drive system with a planetary gear mechanism with output via the ring gear, wherein the planet carrier can be supported via an overrun clutch and/or a torque transmission means on the casing of the planetary gear mechanism.

In FIG. 12 a further embodiment example of a drive system according to the invention is shown. The energy storage device and the power electronics are not shown. The combined drive system shown in FIG. 12 has substantially the same elements as the combined drive system shown in FIG. 11. In the combined drive system shown in FIG. 12, the secondary drive machine 2 and primary drive machine 1 are oriented coaxially aligned to each other. The secondary drive machine 2 and the primary drive machine 1 can be connected via the planetary gear mechanism 10b with the drive element of the vehicle 4.

The secondary drive shaft 2.1 can be connected with the primary drive shaft 1.1 via a torque transmission means 8, here preferably designed as a clutch, wherein this has an input side 8.1 and an output side 8.2. The primary drive shaft 1.1 is connected with the sun wheel 10b.1 via the gear input element 10.1. The planet carrier 10b.2 can be connected with the sun wheel 10b.1 via a further torque transmission means 8a, here preferably designed as a clutch. The ring gear 10b.3 forms the gear output element 10.2 and is connected via the output device 3 with the drive element of the vehicle 4. The planet carrier 10b.2 can be connected via an overrun clutch 9 and a further torque transmission means 8b, here preferably designed as a brake device, with the gear casing 10.3 of the planetary gear mechanism 10b.

If the torque transmission means 8a between the sun wheel 10b.1 and the planet carrier 10.2 is closed, the planetary gear mechanism 10b has a rotation speed ratio of 1:1.

In contrast to the combined drive system shown in FIG. 9, the combined drive system shown in FIG. 12 has no adapter gear mechanism 10a. By the omission of the adapter gear mechanism 10a it is to be assumed that the efficiency of power transmission rises and that also the mass inertia moment of the primary drive machine can advantageously be used for vibration damping of the secondary drive machine. It is however to be noted that by the connection of the secondary drive machine 2 and primary drive machine 1 to a common planetary gear mechanism 10b, the possibilities for rotation speed adaptation between the secondary drive shaft 2.1 and primary drive shaft 1.1 are poorer and as a result disadvantages can arise in relation to the efficiency of the total combined drive system.

Figure 13:
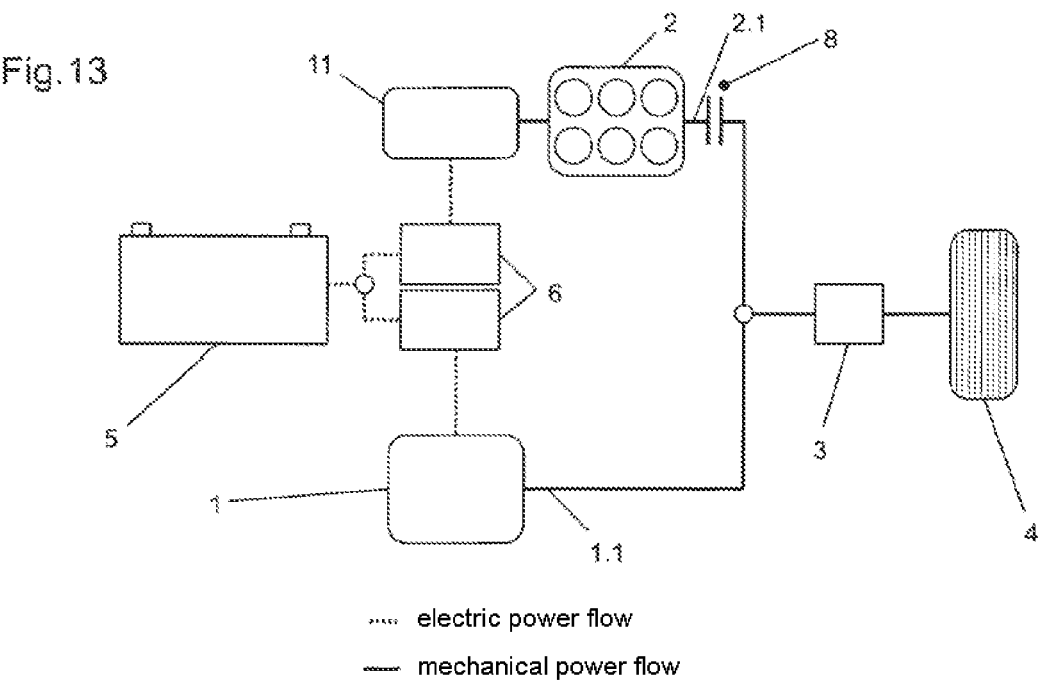
FIG. 13 a combined drive system corresponding to the present state of the art (mild hybrid)

In FIG. 13 a full hybrid drive common today is shown systematically as the prior art. This combined drive system has an energy storage device 5, two power electronic units 6, a primary drive machine 1, a generator 11, a secondary drive machine 2, a torque transmission means 8, an output unit 3 and a drive element of the vehicle 4. In a full hybrid drive system, firstly the advantage arises that two complete drive systems are combined and hence particularly high drive performance can be achieved.

Secondly the disadvantage arises that these two complete drive systems increase the vehicle weight and costs. In comparison with the combined drive system according to the invention, the full hybrid drive system therefore constitutes a relatively heavy and hence less efficient solution variant. It is to be noted that although theoretically the entire power stored in the vehicle can be recovered (recuperated) in overrun mode, in practice this proportion is lower since repeated energy conversion is required for recuperation. As a result a lightweight motor vehicle, despite the possibility of recuperation, can be operated more efficiently than a heavy motor vehicle.

Figure 14:
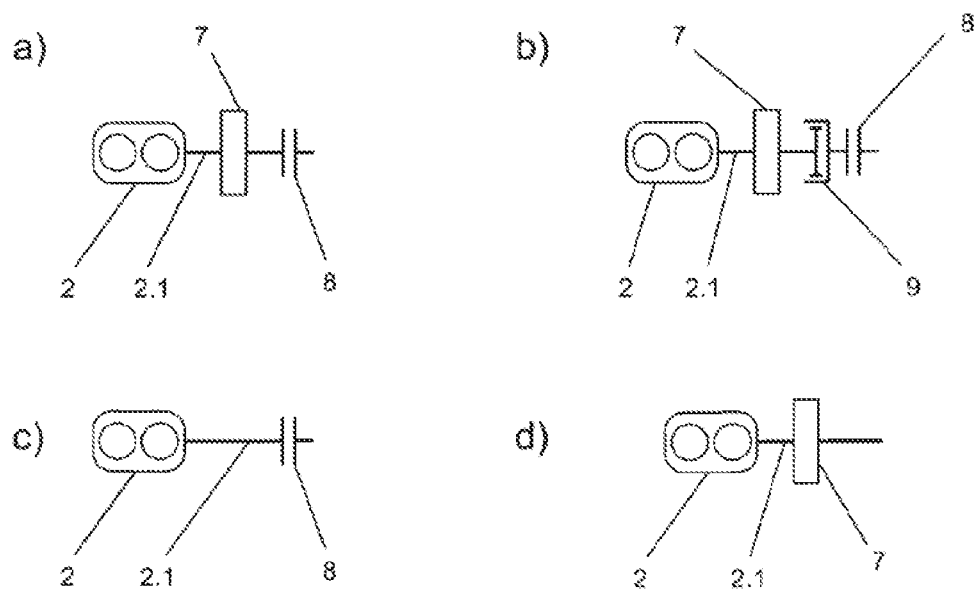
FIG. 14 some possible arrangements and combinations of secondary drive machine, vibration damper, torque transmission means and overrun clutch.

FIG. 14 shows various possibilities for combining the secondary drive machine 2 with torque transmission means 8, here preferably designed as a clutch, or with torsional vibration dampers 7. If the secondary drive machine 2 is designed as a drive machine with an output torque subject to torsional vibrations—as is the case e.g. with reciprocating piston engines normally used today—it is sensible to combine the secondary drive machine 2 with a torsional vibration damper 7. It is pointed out that the mass inertia moment of the primary drive machine can advantageously be used for vibration damping. Preferably the primary drive machine is used as one mass of a dual mass flywheel.

The secondary drive machine 2 is combined with a torsional vibration damper 7 for damping torsional vibrations in FIGS. 14a, 14b and 14d. If as large a part as possible of the potential and/or kinetic energy stored in the motor vehicle is to be recovered and stored in the energy storage device (not shown), it is useful to be able to interrupt the power flow to the secondary drive machine 2 via the torque transmission means 8. This interruption of the power transmission to the secondary drive machine 2 can be achieved by a torque transmission means 8.

The secondary drive machine 2 is combined with a torque transmission means 8 in FIGS. 14a, 14b and 14c. By combining the secondary drive machine 2 with an overrun clutch 9 and a further torque transmission means 8, additional possibilities of increasing the efficiency or improving the comfort of the combined drive system can be achieved.

The possibilities for combining the secondary drive machine 2 with further devices (7, 8, 9) shown in FIGS. 14a to 14d are in principle suitable for combination with each combined drive system according to the invention. Depending on the remainder of the combined system however, preferred embodiments arise for the secondary drive machine 2 with further devices (7, 8, 9). A specific selection of the preferred combination possibilities is shown in FIGS. 5 to 12.

Figure 15:
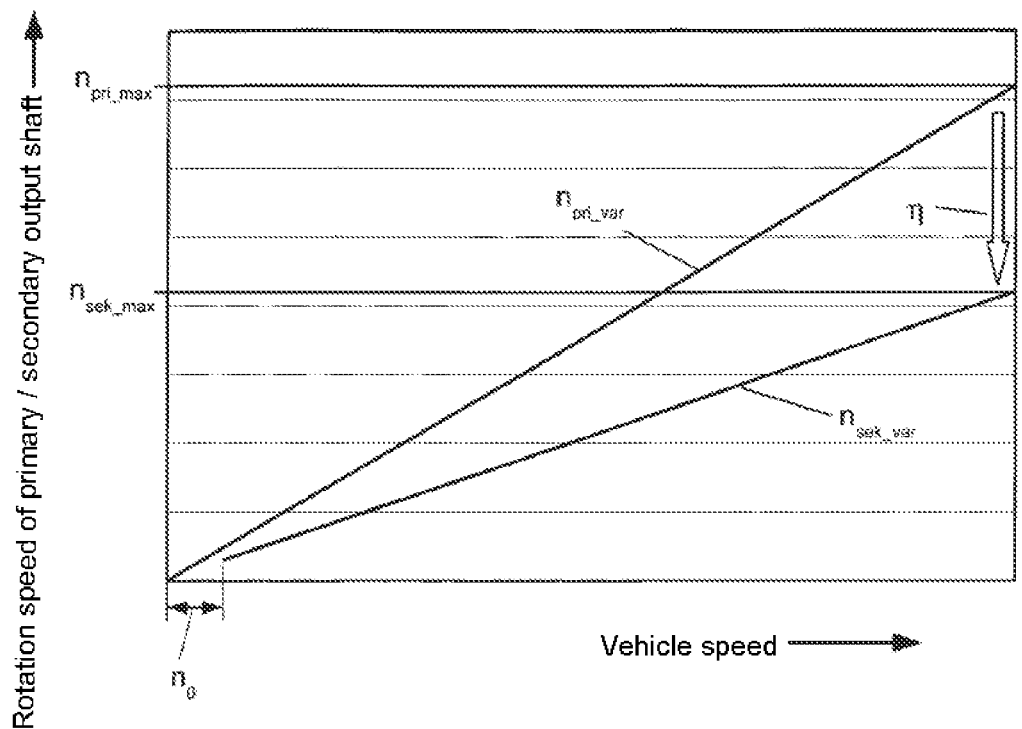
FIG. 15 the correlations for speed adaptation between the primary drive machine and the secondary drive machine.

FIG. 15 shows the correlation of the rotation speed of the primary and secondary drive machines and the vehicle speed for a combined drive system according to the invention. The depiction in FIG. 15 is based on the assumption that the combined drive system has no selectable gear mechanism. However, the fundamental considerations from FIG. 15 also apply to combined drive systems with selectable gear mechanism. Preferably the primary drive machine is selected such that its maximum rotation speed $n_{pri\_max}$ is higher than the maximum rotation speed of the secondary drive machine $n_{sek\_max}$.

For the rotation speed of both drive machines, according to FIG. 15 these are proportional to the vehicle speed. In FIG. 15 it is assumed that the secondary drive machine is a drive machine which cannot output a torque above rotation speed $n_{sek\_var}=0$. This applies for example to reciprocating piston engines common today. This range is marked $n_0$. The proportional correlation of the two rotation speeds $n_{pri\_var}$ and $n_{sek\_var}$ with the vehicle speed allows the rotation speed of the secondary drive machine $n_{sek\_var}$ to be adapted to the rotation speed of the primary drive machine $n_{pri\_var}$, or vice versa, by a gear mechanism with only one discrete translation stage.

Combined drive systems in which such rotation speed adaptations are performed by an adapter gear mechanism are shown for example in FIGS. 6 and 8. Due to the property of the secondary drive machine in the region $n_0$, a torque transmission means is required to separate the power transmission from the secondary drive machine to the combined drive system. Combined drive systems with a torque transmission means to separate the power transmission are shown for example in FIGS. 5 to 12.

FIG. 16 shows the correlation between the rotation speed difference between the primary drive machine $n_{pri\_max}$ and secondary drive machine $n_{sek\_max}$ with the weight, construction space and costs caused by an adapter gear mechanism necessary for the mutual adaptation of these rotation speeds. This region is marked IG. It is clear in FIG. 16 that a low rotation speed of the primary drive machine $n_{pri\_max}$ and secondary drive machine $n_{sek\_max}$ tends to lead to higher weight, construction space and costs of the gear mechanism, since in a gear mechanism which transmits a constant power (PC), the torque rises as the rotation speed falls.

In general the power-transmitting components in the gear mechanism are dimensioned according to the torque to be transmitted. Therefore high rotation speeds tend to lead to lighter components. As explained, a lightweight motor vehicle with combined drive system can be operated more efficiently than a heavy one. It must however be noted that as rotation speeds rise, the system-induced power losses rise. This in turn has a harmful effect on the efficiency of a combined drive system.

Figure 17:
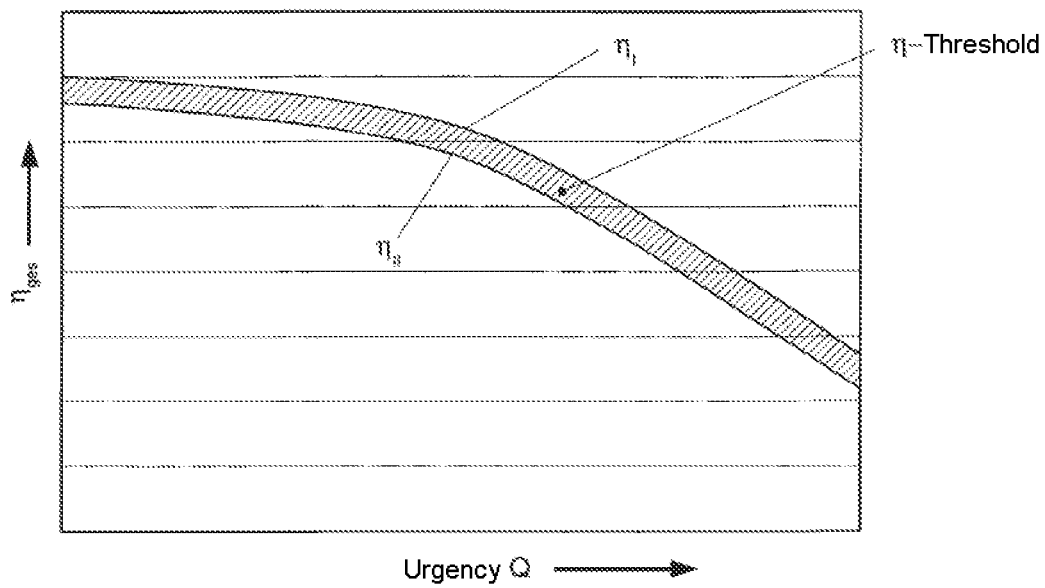
FIG. 17 the urgency of recharging the electrical energy storage device depending on the efficiency of a combined drive system.

FIG. 17 shows the correlation between the efficiency $\eta_{ges}$ of the combined drive system and the urgency Q for active generation of electrical energy. Active generation of electrical energy means that the secondary drive machine both emits power to overcome the driving resistances and drives the primary drive machine to generate electrical energy. In active generation of electrical energy, the energy generated in the primary drive machine is stored in the energy storage device.

The urgency Q depends on various parameters. Such parameters are preferably the present charge state of the energy storage device, route information and environmental parameters and input possibilities from vehicle occupants. Preferably the urgency Q increases when the energy content of the energy storage device is low, and vice versa. At a low energy Q—the energy content of the energy device is high—preferably electrical energy is generated actively only when this generation can take place at a high efficiency $\eta_{ges}$ of the combined drive system. If the urgency Q is high, the combined drive system is controlled such that energy is actively generated even though this takes place with a poor efficiency $\eta_{ges}$.

These fundamental correlations are determined by the $\eta$ threshold. The $\eta$ threshold links together the conditions previously cited into a load strategy with the possibility for active energy generation. This $\eta$ threshold is preferably limited by a lower value $\eta_2$ and/or an upper value $\eta_1$. The upper value $\eta_1$ and lower value $\eta_2$ prevent constant switching between an operating state with active energy generation and an operating state without active energy generation.

Figure 18:
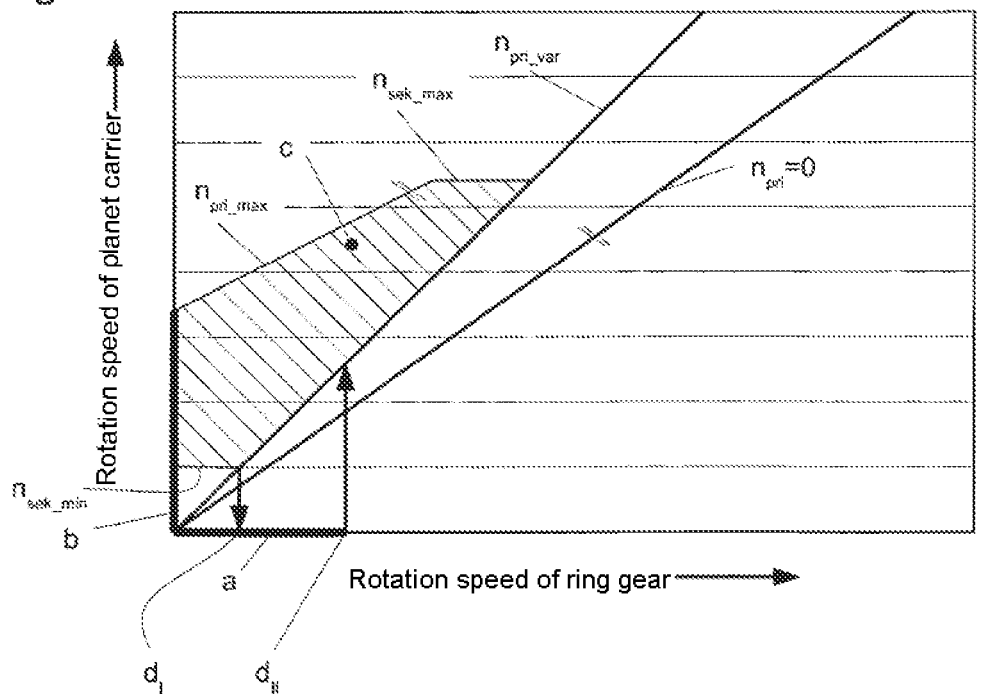
FIG. 18 the rotation speed ratios for a combined drive system with planetary gear mechanism between the rotation speed of the planet carrier and the rotation speed of the ring gear.

FIG. 18 shows in qualitative terms the rotation speed ratios of a planetary gear mechanism as shown for example in FIG. 10. The line marked a in FIG. 18 represents the rotation speed for the ring gear. The line marked b represents the rotation speed of the planet carrier. The ring gear is connected with the drive element of the vehicle. The planet carrier can be connected optionally with the secondary drive machine and/or with the output shaft of the primary drive machine.

By overlaying the rotation speed of the secondary drive machine with the rotation speed of the primary drive machine, the planetary gear mechanism can be operated with continuously adjustable rotation speed ratio in the rotation speed range marked c. Optionally the planetary gear mechanism can also be operated with a discrete rotation speed ratio of 1:1. The rotation speed range c is limited upwards by the maximum possible rotation speeds of the drive machines $n_{sek\_max}$ and $n_{pri\_max}$ and downwards by the variably adjustable rotation speed of the secondary drive machine $n_{sek\_var}$ and the lowest rotation speed $n_{sek\_min}$ which can be achieved with the secondary drive machine. The rotation speed $n_{sek\_min}$ is for example the idle speed of a reciprocating piston engine. Here the rotation speed $n_{sek\_var}$ of the secondary drive machine is preferably set such that a high efficiency is achieved for the combined drive system. By this overlaying of rotation speeds of the primary drive machine and secondary drive machine, it is possible in particular to operate the secondary drive machine in a favorable efficiency range.

Via a torque transmission means, the sun wheel of the planetary gear mechanism can be connected with the planet carrier. As a result a rotation speed ratio of 1:1 is achieved for the planetary gear mechanism. FIG. 18 shows as an example for the planetary gear mechanism the shift points $d_I$ and $d_{II}$ from the variable rotation speed ratio to the 1:1 ratio. The upshift point $d_{II}$ and the downshift point $d_I$ are selected differently to prevent frequent shift processes and to allow energy efficient operation.

The shift points $d_I$ and $d_{II}$ should be selected such that with the first translation range in particular great driving resistances can be overcome, such as pulling away on a gradient or driving over a curbstone. The shift to the translation ratio 1:1 range is carried out in particular when constant travel resistances are overcome, such as for example on a long journey at constant speed. The overlaying of the two rotation speeds of the drive machines and the possibility of 1:1 translation of the planetary gear mechanism thus allows an energy-efficient operation of the combined drive system.

Figure 19:
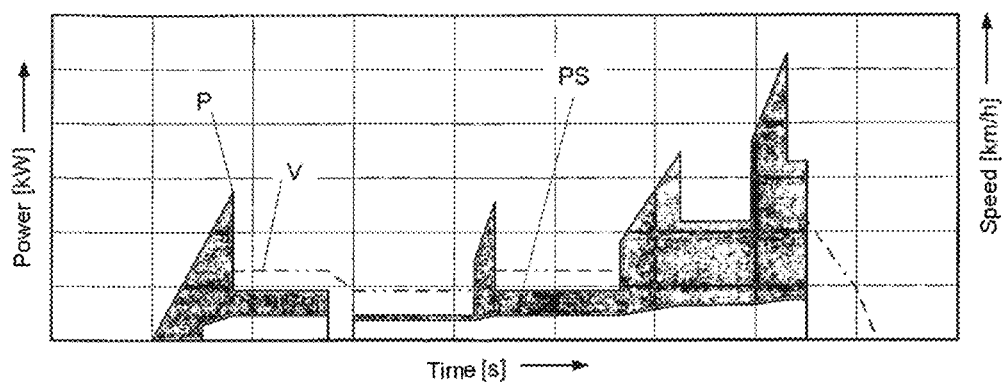
FIG. 19 the power demand and the speed of a motor vehicle with combined drive system with a small secondary drive machine in the extra-urban drive cycle (EUDC)

FIG. 19 shows the power requirement P and the speed V of the motor vehicle with a vehicle weight of around 1000 kg for a predefined drive cycle (extra-urban drive cycle EUDC) over time. This drive cycle comprises in particular rural driving with phases of acceleration, constant speed and deceleration. Also FIG. 19 shows the secondary power PS which is generated by the secondary drive machine in this drive cycle.

In FIG. 19 it can be seen that the secondary power PS lies below the power requirement P of the motor vehicle during the acceleration and constant speed phases. A motor vehicle with a combined drive system which comprises a secondary drive machine with the nominal secondary power shown in FIG. 19 cannot generate electrical energy actively during the drive cycle shown. The nominal secondary power is the power which a secondary drive machine can output permanently. Because there is no charging potential during normal driving operation due to the low nominal secondary power, the achievable range depends greatly on the size of the energy storage device. The charging potential means that the secondary drive machine not only emits the power necessary for movement of the motor vehicle but simultaneously electrical energy can be actively stored. The active energy generation can thus recharge the energy storage device during travel and hence the range of the vehicle can be extended.

Figure 20:
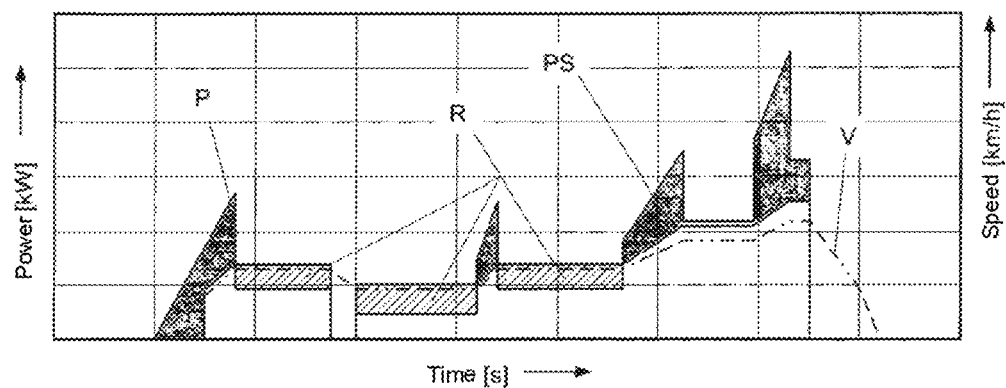
FIG. 20 the power demand and the speed of a motor vehicle with combined drive system with a larger secondary drive machine than in FIG. 18 in the extra-urban drive cycle (EUDC)

FIG. 20 shows the same drive cycle as in FIG. 19. In FIG. 20 this drive cycle is performed by a motor vehicle weighing 1000 kg with a combined drive system, wherein the secondary drive machine has a higher nominal secondary power than in the motor vehicle shown in FIG. 19. Because of the higher nominal secondary power, during the drive cycle in FIG. 20, charging potential R exists. This charging potential R arises preferably during the constant speed phases, in particular when the speed V is not high. Here preferably the secondary power PS is greater than the power requirement P. With a combined drive system configured according to the teaching of FIG. 20, electrical energy can be generated actively during travel.

Figure 21:
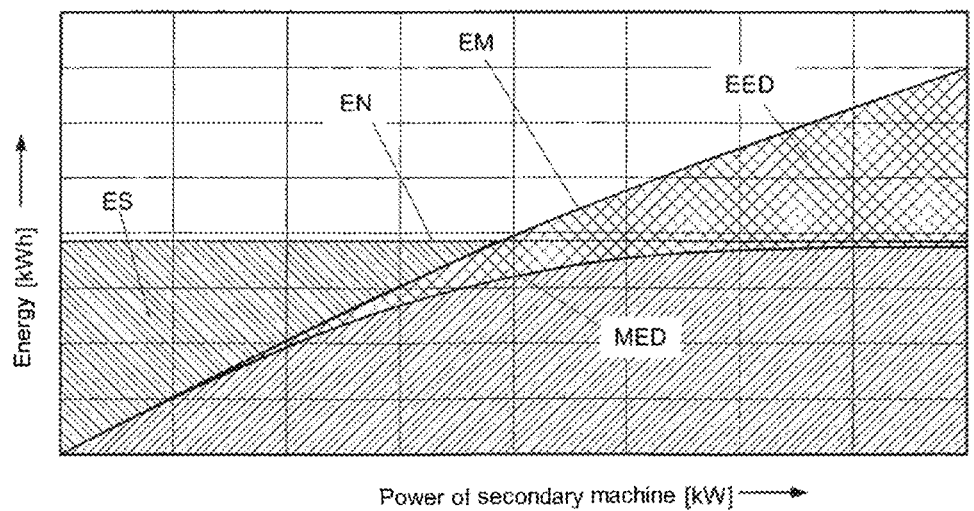
FIG. 21 energy demands as a function of power of the secondary machine for a motor vehicle with combined drive system during the extra-urban drive cycle (EUDC)

FIG. 21 shows the energy requirements EN and the energy acquisition potential (ES, MED, EED, EM) over the power of the secondary drive machine for the EUDC. It is evident that as the secondary power increases, the possibility of generating electrical energy (EED) actively during travel also increases. If the total electrical energy needed for the drive requirement (EN) is equal to the energy (ES) stored in the energy storage device at the start of travel, the secondary drive machine need not output any electrical power for active energy generation. This would be the case for example with purely electric vehicles. It is clear that for such a motor vehicle, the range is limited by the size of the electrical energy storage device.

If substantially no electrical energy (ES) is stored in the electrical energy storage device at the start of travel and there is no possibility of generating electrical energy, the total energy requirement (EN) must be covered by the secondary drive machine. This would be the case for a vehicle operated purely by a combustion engine. The secondary drive machine outputs the energy (MED) directly for driving the motor vehicle. For a motor vehicle operated exclusively by a combustion engine, the range is dependent only on the tank capacity. However emission-free operation, such as is becoming increasingly important, is not possible.

The combined drive system according to the invention therefore has firstly an electrical energy storage device which can be filled with electrical energy (ES) before the vehicle begins its journey. Also such a combined drive system has a secondary drive machine which provides the energy (MED) directly for driving the vehicle and during the journey can emit power for active electrical energy generation. At most with such a system, the electrical energy (EM) can be generated. The efficiency of a combined drive system according to the invention is decisively influenced by the correct choice of secondary drive machine and electrical energy storage device.

Figure 22:
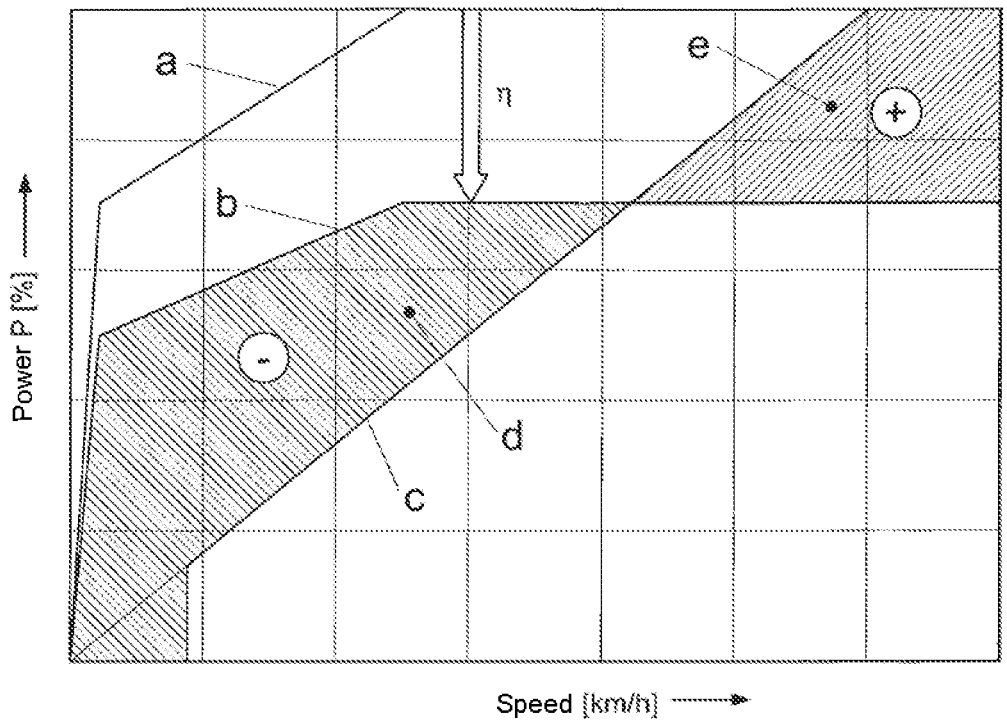
FIG. 22 a comparison of the emittable power of a combined drive system without selectable gear mechanism for the electric path (serial hybrid) with the mechanical path (mechanical through-drive)

FIG. 22 shows the drive power which can be provided by different combined drive systems for driving a motor vehicle, over the speed which a motor vehicle reaches with such a drive system. Here two fundamentally different operating states of combined drive systems are compared.

The first is the operating state of a combined drive system in which all drive elements of the vehicle are supplied with drive power exclusively by the primary drive machine, wherein this drive power is generated in the secondary drive machine and converted into electrical energy in a generator. This electrical energy is either passed to the primary drive machine and/or stored in an electrical energy storage device. This operating state of a combined drive system is known as serial hybrid drive mode. Serial hybrid drive mode offers the advantage that the speed of the motor vehicle in wide ranges is independent of the rotation speed of the secondary drive machine. Thus the secondary drive machine can be operated in an efficient range. At low speeds of the motor vehicle, additional requirements apply to the noise emissions and vibration damping of the combined drive system, so that for this speed range not all the power of the secondary drive machine can be used to drive the motor vehicle. The power theoretically available to drive a motor vehicle with such a drive system is marked a in FIG. 22.

The repeated energy conversion described from the secondary drive machine up to the drive element of the vehicle carries an efficiency $\eta$. This efficiency $\eta$ leads to less than the theoretically possible power a being available to drive the motor vehicle, so that the actual development of the power to drive the motor vehicle is that marked b.

Secondly the power for driving a motor vehicle which preferably can be provided with a combined drive system according to the invention is shown in FIG. 22 and marked c. With a combined drive system according to the invention there is the possibility of conducting the power generated in the secondary drive machine directly, i.e. without further conversion of energy form, to the drive element of the vehicle. This particularly advantageous mode is designated mechanical through-drive.

Here the curve marked c indicates the power to drive the motor vehicle with a combined drive system according to the invention with only one fixed translation stage of the gear mechanism, which is operated in this through-drive mode. As a result the rotation speed of the secondary drive machine in wide ranges depends greatly on the speed of the motor vehicle, as a first approximation is proportional to this.

If we compare the powers of the two combined drive systems (curves c and b), it is evident that in the range of low speeds more power can be provided to drive the motor vehicle by a combined drive system in serial hybrid drive mode than by a drive system according to the invention in through-drive mode. Ranges in which this power ratio applies are marked d. In the range of medium and high speeds, the combined drive system according to the invention in through-drive mode has efficiency advantages over the combined drive system in serial hybrid drive mode. The power which can be provided to drive the motor vehicle via the drive system according to the invention, in the regions marked e, is greater than with the combined drive system in serial hybrid drive mode.

Figure 23:
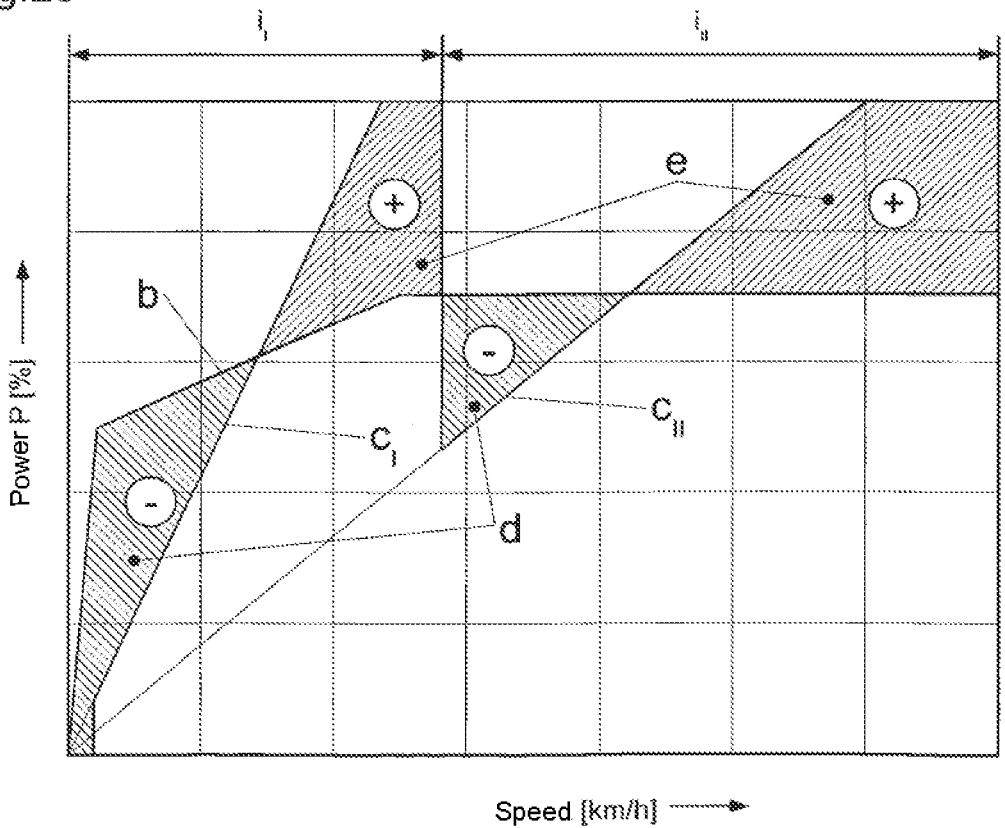
FIG. 23 a comparison of the power available from a combined drive system with selectable gear mechanism ($i_I$, $i_{II}$) for the electric path (serial hybrid) with the mechanical path (mechanical through-drive)

In FIG. 23 largely the same combined drive systems are compared as in FIG. 22. The difference between FIG. 22 and FIG. 23 is that the combined drive system according to the invention in FIG. 23 has a selectable gear mechanism with two gear stages $i_I$ and $i_{II}$.

With two gear stages of the selectable gear mechanism, the possibility arises of adapting the output speed of the secondary drive machine to the speed of the motor vehicle in two stages. These two regions are marked $i_I$ and $i_{II}$. The selectable gear mechanism gives the power curves $c_I$ and $c_{II}$. These represent the power which can be emitted by the secondary drive machine to drive the motor vehicle.

Thanks to the selectable gear mechanism, the preferred regions e are expanded and regions d reduced. As a trend, more gear stages of a selectable gear mechanism lead to a poorer efficiency and a higher weight of the combined drive system, so that—as also shown in FIG. 3—the number of translation stages of the gear mechanism of a drive system according to the invention lies between one and four.

Figure 24:
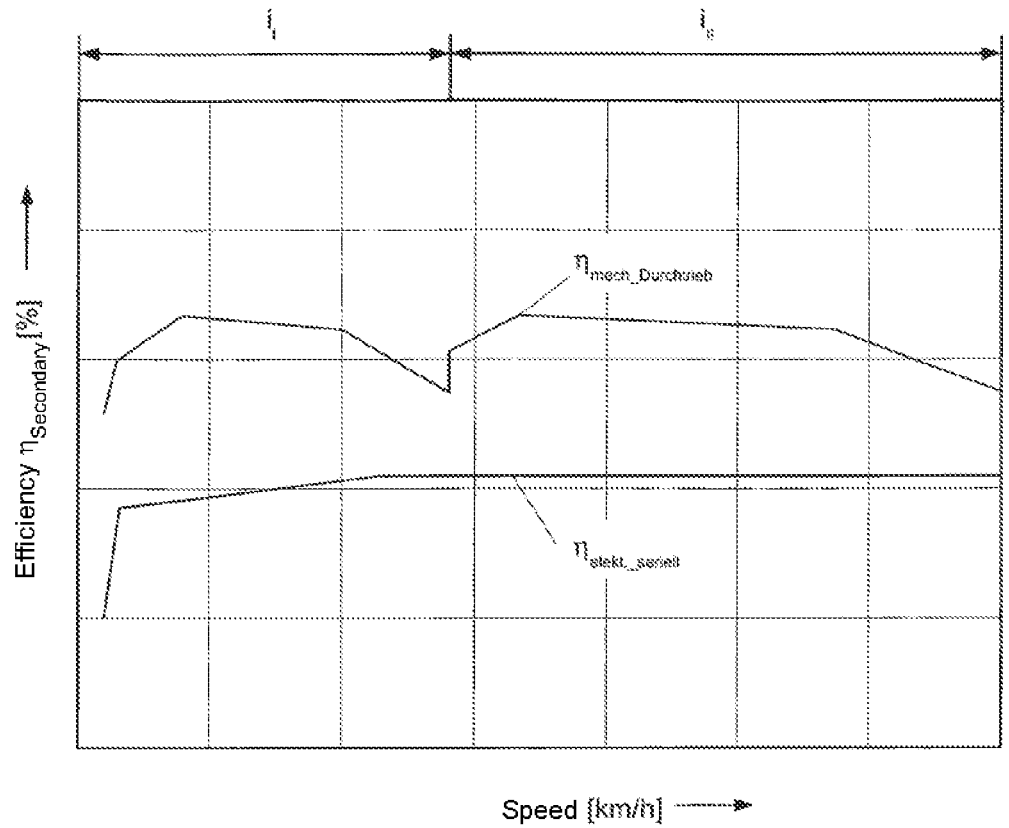
FIG. 24 a comparison of the efficiencies of the electric drive path (serial hybrid) and mechanical drive path (mechanical through-drive) with selectable gear mechanism for combined drive systems.

FIG. 24 shows a comparison of the efficiencies $\eta_{mech\_Durchtrieb}$ and $\eta_{elekt\_seriell}$ of the two combined drive systems described in FIG. 23, over the speed of the motor vehicle. Here the efficiency of a combined drive system which is in a serial hybrid drive mode is marked $\eta_{elekt\_seriell}$. The efficiency of the combined drive system according to the invention with selectable gear mechanism with two translation stages is designated $\eta_{mech\_Durchtrieb}$. The efficiency $\eta_{mech\_Durchtrieb}$ of the combined drive system according to the invention is throughout higher than the efficiency $\eta_{elekt\_seriell}$ of a combined drive system in serial hybrid drive mode. The combined drive system according to the invention therefore constitutes an efficient possibility for driving a motor vehicle.

Figure 25:
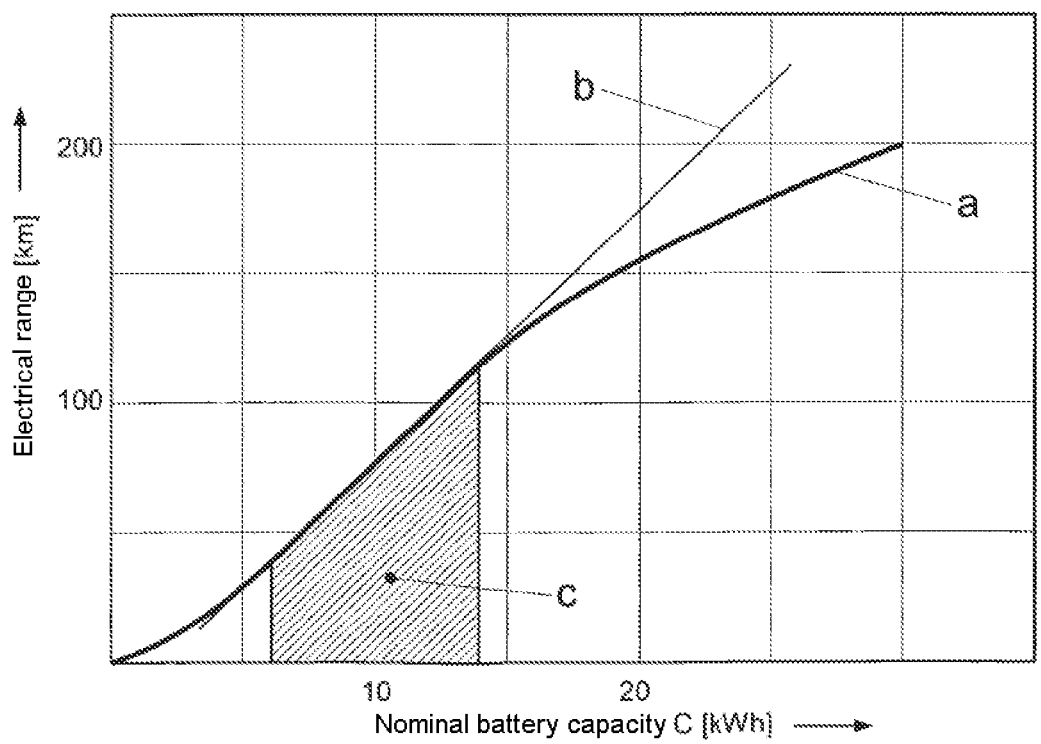
FIG. 25 the graph of the electric range over the nominal battery capacity taking into account battery weight for a motor vehicle with combined drive system.

FIG. 25 shows the graph of the electric range a of a motor vehicle with combined drive system over the nominal battery size. The energy quantity actually available to drive the motor vehicle from the electrical energy storage device is smaller than the nominal battery size, since an electrical energy storage device according to the current state of the art cannot be discharged completely.

In principle the correlation exists that the electrical energy storage device with larger nominal battery capacity leads to a greater achievable electric range of the motor vehicle. It must however be taken into account that a larger nominal battery capacity leads to an increase in vehicle weight.

In relation to vehicle weight, the fundamental correlation applies that as the vehicle weight increases, the achievable range of the motor vehicle diminishes under otherwise equivalent peripheral conditions. FIG. 25 shows accordingly that the electric range a of a motor vehicle first grows progressively with the nominal battery capacity. For a nominal battery capacity which is constantly increasing further, the electric range however runs degressively from a specific point.

Preferably the nominal battery size of the electrical energy storage device is selected such that this lies substantially in the range of the maximum gradient b of the function a shown, i.e. in region c. For a motor vehicle with a total weight of around 1000 kg with the electrical energy storage devices normally used today, a nominal battery size for a combined drive system according to the invention lies in the range from 5 to 15 kWh.

Figure 26:
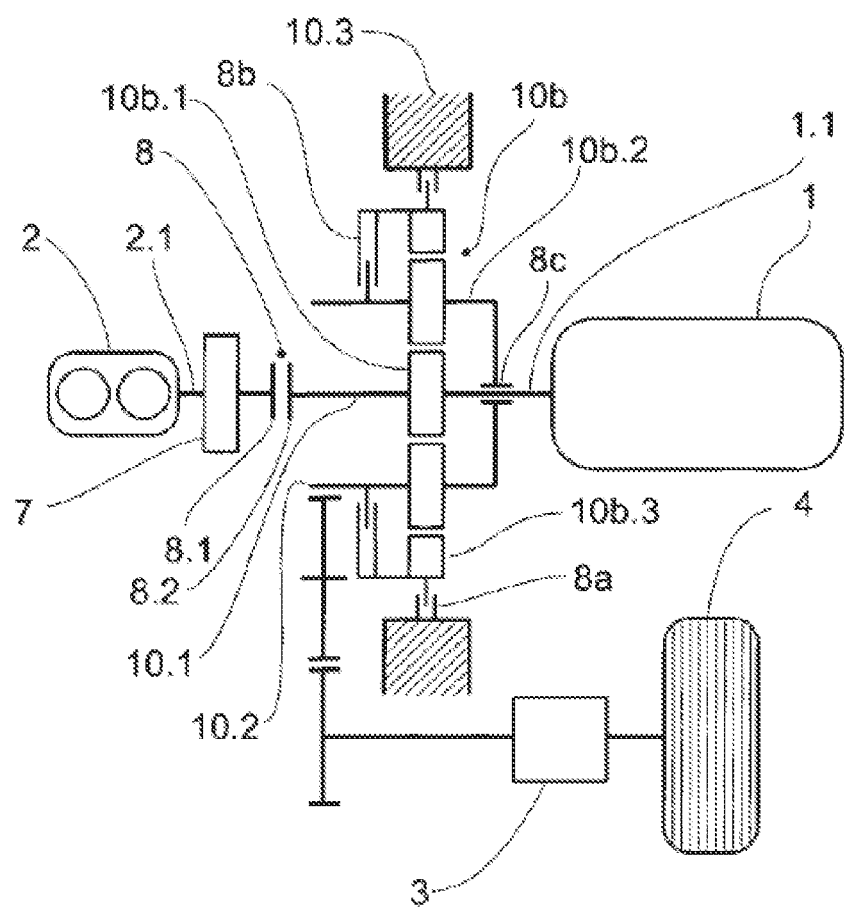
FIG. 26 a combined drive system with a planetary gear mechanism as selectable gear mechanism with output via the planet carrier, wherein the primary drive machine and secondary drive machine are oriented coaxially aligned to each other.

FIG. 26 shows a combined drive system as shown substantially also in FIG. 11. The energy storage device and the power electronics are not shown.

In this combined drive system the secondary drive shaft 2.1 can be connected via a torsional vibration damper 7, here preferably designed as a flywheel, and a torque transmission means 8, here preferably designed as a clutch, with a gear input element 10.1 and hence with the sun wheel 10b.1. The power flow between the secondary drive machine 2 and this gear input element 10.1 of the planetary gear mechanism 10b can therefore be influenced by the torque transmission means 8 with an input side 8.1 and an output side 8.2.

The primary drive shaft 1.1 is connected with a gear input element 10.1 and hence with the sun wheel 10b.1 of the planetary gear mechanism 10b. The primary drive machine 1 and secondary drive machine 2 are consequently arranged coaxially aligned to each other. The drive element of the vehicle 4 is connected with the gear output element 10.2 and hence with the planet carrier 10b.2 by means of an output unit 3, which is here preferably a differential gear mechanism.

The ring gear 10b.3 can be stopped by means of a further torque transmission means 8a, here preferably designed as a brake device, in relation to the gear casing 10.3. In this stopped state, the ring gear 10b.3 performs no rotary movement in relation to the gear casing 10.3. When the ring gear 10b.3 is stopped and the further torque transmission means 8b-here preferably designed as a clutch which is arranged between the planet carrier 10b.2 and ring gear 10b.3—is open, the planetary gear mechanism 10b has a first translation ratio.

The planet carrier 10b.2 and the ring gear 10b.3 can be connected together rotationally fixed via a torque transmission means 8b arranged between these, alternatively it is also possible as shown in FIG. 11 for the planet carrier 10b.2 and sun wheel 10b.1 to be able to be connected together in the same way by means of a torque transmission means. When the planet carrier 10b.2 and ring gear 10b.3 are connected together and the ring gear 10b.3 is no longer stopped, the planetary gear mechanism has a second translation ratio of 1:1.

REFERENCE SYMBOLS

| | |
|---|---|
| 1 | Primary drive machine |
| 1.1 | Primary drive shaft |
| 2 | Secondary drive machine |
| 2.1 | Secondary drive shaft |
| 3 | Output unit |
| 4 | Drive element of motor vehicle |
| 5 | Energy storage device |
| 6 | Power electronics |
| 7 | Torsional vibration damper |
| 8 | Torque transmission means |
| 8.1 | Input side (of torque transmission device) |
| 8.2 | Output side (of torque transmission device) |
| 9 | Overrun clutch |
| 10 | Gear mechanism |
| 10.1 | Gear input element |
| 10.2 | Gear output element |
| 10.3 | Gear casing |
| 10.4 | Second gear input element |

-continued

| | |
|---|---|
| 10a | Adapter gear mechanism |
| 10b | Planetary gear mechanism |
| 10b.1 | Sun wheel |
| 10b.2 | Planet carrier |
| 10b.3 | Ring gear |
| 10b.4 | Planet |
| 10c | Selectable gear mechanism |
| 11 | Generator |

ABBREVIATIONS

| | |
|---|---|
| P | Power demand in EUDC (power) |
| V | Velocity in EUDC (velocity) |
| PS | Power of secondary drive machine (power secondary) |
| R | Charging potential in EUDC (recharge) |
| ES | Energy stored at start of travel (energy stored) |
| EN | Energy quantity required for EUDC per 1000 kg vehicle weight (energy need) |
| EM | Maximum energy which can be generated (energy maximum) |
| MED | Mechanical energy applied directly during travel (mechanical energy drive) |
| EED | Electrical energy generated during the drive (electrical energy drive) |
| PPA | Power of primary drive machine |
| PSA | Power of secondary drive machine |

What is claimed is:

1. A motor vehicle with a combined drive system, wherein the drive system comprises
at least one primary drive machine which comprises at least one primary drive shaft to receive or output a power,
at least one secondary drive machine which comprises at least one secondary drive shaft to output a power,
a torque transmission device which comprises at least one input side connected with the secondary drive shaft and at least one output side, the torque transmission device being capable of influencing a torque introduced from the at least one input side and output via the at least one output side,
at least one energy storage device,
at least one output device which supplies a power output from the at least one primary drive machine and/or the at least one secondary drive machine to the vehicle as a drive power,
wherein the at least one primary drive machine can be operated at least in a first operating state in which power is output by the primary drive shaft to drive the vehicle, and at least in a second operating state in which power received via the primary drive shaft from the secondary drive shaft can be stored at least partly as energy in the energy storage device, and
wherein the vehicle is configured to operate using a method for operating the combined drive system in order to achieve high energy efficiency,
wherein at least three of the following operating states are implemented:
powers of the secondary drive machine and the primary drive machine are used jointly to drive the motor vehicle, the secondary drive machine being mechanically coupled into a drive;
the secondary drive machine provides drive and the primary drive machine is driven via a primary drive shaft and energy generated by the primary drive machine is stored at least partially;
the primary drive machine provides drive and the secondary drive machine is stopped;
the primary drive machine is driven via a primary drive shaft and the secondary drive machine is stopped or at idle,
wherein the combined drive system is set into different operating states as a function of various peripheral conditions, and wherein the drive system can be controlled taking into account the operating state and operating needs by a user,
wherein at least one control device is provided which directly or indirectly determines one or more of:
rotation speed and/or acceleration of the primary drive shaft,
at least one temperature of the primary drive machine and/or rotation speed and/or acceleration of a secondary drive shaft,
at least one temperature of the secondary drive machine,
rotation speed and/or acceleration of the output device,
rotation speed and/or acceleration of at least one gear input element,
at least one temperature of a gear mechanism and/or rotation speed and/or acceleration of at least one drive element of the vehicle,
rotation speed and/or acceleration of the secondary drive machine,
fill level of at least one energy storage device,
at least one temperature of at least one energy storage device,
at least one current intensity and/or voltage of at least one energy storage device,
rate of pitch,
rate of roll,
rate of yaw,
at least one distance from at least one other traffic participant,
at least a suspension compression state of a suspension device,
information being stored in this control device and corresponding data being linked so that the combined drive system is controlled taking into account the determined values,
in order to provide the drive power required additionally in discontinuous driving situations by the primary drive machine while the secondary drive machine is operated with low pollutant emissions,
wherein the drive system further comprises a gear mechanism which is configured to adapt rotation speeds of the drive shafts of the primary and secondary drive machines to travel speed and to operate both the primary and the secondary drive machine with high efficiency close to a respective optimum efficiency,
wherein the gear mechanism comprises a planetary gear mechanism or is a planetary gear mechanism,
wherein at least two shafts of the planetary gear mechanism are connectable to each other for being moved with the same rotation speed,
wherein the planetary gear mechanism comprises a sun wheel, at least one planet, a ring gear, and a planet carrier, and
wherein the at least two connectable shafts are constituted by the sun wheel or a sun wheel shaft, the ring gear or a ring gear shaft, and the planet carrier.

2. The motor vehicle of claim 1, wherein a ratio of a nominal power of the at least one primary drive machine (PPA) and a nominal power of the at least one secondary drive machine (PSA) is 0.5<PPA/PSA<10.

3. The motor vehicle of claim 1, wherein only a single primary drive machine is provided to store energy in the energy storage device.

4. The motor vehicle of claim 1, wherein the at least one primary drive machine and the output side of the torque transmission device are each connected with at least one gear input element of at least one gear mechanism, the at least one gear mechanism furthermore comprising at least one gear output element.

5. The motor vehicle of claim 1, wherein the at least one primary drive machine and the output side of the torque transmission device are each connected with at least one gear input element of at least one gear mechanism with variable translation ratio, the gear mechanism being designed such that at least two different translation ratios can be set between at least one gear input element and at least one gear output element.

6. The motor vehicle of claim 4, wherein the torque transmission device arranged between the secondary output shaft and the gear mechanism is formed as a clutch.

7. The motor vehicle of claim 1, wherein the at least one primary drive machine is an energy converter in which electrical energy is converted into kinetic or mechanical energy, or kinetic or mechanical energy is converted into electrical energy.

8. The motor vehicle of claim 1, wherein the at least one secondary drive machine is a combustion engine in which chemically bonded energy is converted by internal or external combustion into kinetic or mechanical energy.

9. The motor vehicle of claim 8, wherein the combustion engine is a reciprocating piston engine.

10. The motor vehicle of claim 1, wherein the at least one secondary drive machine is a rotary piston engine.

11. The motor vehicle of claim 8, wherein the combustion engine comprises a starter device for accelerating the combustion engine for starting.

12. The motor vehicle of claim 1, wherein the at least one energy storage device has a storage capacity which allows a vehicle range on the level, using the primary drive machine and without using the secondary drive machine, of about 10 km to about 400 km.

13. The motor vehicle of claim 1, wherein the at least one energy storage device stores electrical energy in chemically bonded form as a storage battery or accumulator.

14. The motor vehicle of claim 13, wherein the at least one energy storage device has a storage capacity of 2 to 40 kWh.

15. The motor vehicle of claim 1, wherein the at least one energy storage device can be connected with an energy supply device by means of which energy can be supplied to the at least one energy storage device from outside the motor vehicle.

16. The motor vehicle of claim 5, wherein the gear mechanism comprises at least two fixed translation stages.

17. The motor vehicle of claim 1, wherein the primary drive shaft and the secondary drive shaft are arranged at least one of coaxially and aligned to each other.

18. The motor vehicle of claim 1, wherein a torque flow can be influenced by one, two, three or more torque transmission devices and the torque transmission devices are selected from one or more of
mechanical clutches and brakes with form-fit or friction engagement,
hydraulic clutches, and
overrun clutches.

19. The motor vehicle of claim 1, wherein the torque transmission device is an overrun clutch.

20. The motor vehicle of claim 1, wherein thermal energy present in at least one of the at least one primary drive machine, the at least one secondary drive machine, a gear mechanism, the at least one energy storage device, and a control device for controlling these combined drive systems is supplied to a fluid suitable for heat transmission and wherein the thermal energy is used directly or indirectly to temper at least one of a passenger compartment, the at least one secondary drive machine, the gear mechanism, the at least one energy storage device, and power electronics.

21. The motor vehicle of claim 1, wherein forward and reverse travel can be accomplished by reversing a direction of rotation of the at least one primary drive machine.

22. The motor vehicle of claim 1, wherein a sum of a nominal power of the at least one primary drive machine and a nominal power of the at least one second drive machine is greater than a power requirement (EN) of the motor vehicle in a predefined drive cycle.

23. The motor vehicle of claim 1, wherein nominal powers of the at least one primary drive machine and the at least one secondary drive machine are selected such that while performing a drive cycle a charging time in which power which can be supplied to the at least one secondary drive machine by the at least one primary drive machine can be stored in the at least one energy storage device is between 20% and 80% of a total cycle time.

24. The motor vehicle of claim 1, wherein a gear mechanism comprises two or three gear stages and gear translation ratios are dimensioned such that when performing a drive cycle, a maximum possible amount of energy is transmitted from the at least one secondary drive machine to the at least one primary drive machine and stored in the at least one energy storage device.

25. The motor vehicle of claim 1, wherein control of charging of the at least one energy storage device is controlled by a control device which, on the basis of a group of parameters containing at least an energy content of the at least one energy storage device, determines a key value for an urgency (Q) with which the at least one energy storage device must be recharged, and wherein the control device furthermore, on the basis of parameters including at least one key value characteristic of operation of the at least one secondary drive machine, calculates an efficiency of a possible charging process and controls the charging process for a predefined function such that for a high urgency (Q) charging is performed irrespective of an efficiency and that for a low urgency (Q) charging is performed as a function of a respective efficiency.

26. The motor vehicle of claim 1, wherein an input device is provided in which a user can specify a route during which no recharging of the at least one energy storage device by an external energy supply can take place, and wherein the route information is taken into account in calculating an urgency (Q) of recharging the at least one energy storage device.

27. The motor vehicle of claim 26, wherein the input device for the route information cooperates with a navigation system.

28. The motor vehicle of claim 1, wherein at least between the secondary drive machine and the output device is fitted at least one torsional vibration damper selected from mechanical vibration dampers.

29. The motor vehicle of claim 1, wherein a difference is determined between a rotation speed of a secondary drive shaft and a rotation speed of a gear input element or a rotation speed of a primary drive shaft, and if the difference is greater than or equal to zero, a torque transmission device is activated and/or engaged so that power flows from the secondary drive machine to the output device.

30. The motor vehicle of claim 1, wherein a charge state of the energy storage device is determined and a power flow from the secondary drive machine to the primary drive machine is permitted only when the charge state of the energy storage device falls below a limit value stored in a control device, the limit value being dependent at least on route and charge state of the energy storage device.

* * * * *